United States Patent [19]

Osaka et al.

[11] Patent Number: 5,530,782
[45] Date of Patent: Jun. 25, 1996

[54] INTERMEDIATE BRANCHING METHOD FOR OPTICAL PATH

[75] Inventors: Keiji Osaka; Tetsuaki Watanabe; Ken Kashima, all of Yokohama, Japan

[73] Assignee: Sumitomo Electric Industries, Ltd., Osaka, Japan

[21] Appl. No.: 308,532

[22] Filed: Sep. 21, 1994

[30] Foreign Application Priority Data

Oct. 22, 1993 [JP] Japan .................... 5-265272

[51] Int. Cl.⁶ .................. G02B 6/26; G02B 6/42
[52] U.S. Cl. .................. 385/45; 385/52; 385/97
[58] Field of Search ................ 385/24, 45, 48, 385/52, 97, 100, 135

[56] References Cited

U.S. PATENT DOCUMENTS

| | | | |
|---|---|---|---|
| 4,728,169 | 3/1988 | Campbell et al. | 385/52 |
| 4,878,933 | 11/1989 | Yamada et al. | |
| 4,961,623 | 10/1990 | Midkiff et al. | 385/135 |
| 5,090,792 | 2/1992 | Koht et al. | 385/135 |
| 5,125,060 | 6/1992 | Edmundson | 385/100 |
| 5,133,039 | 7/1992 | Dixit | 385/135 |
| 5,210,812 | 5/1993 | Nilsson et al. | 385/100 |
| 5,267,338 | 11/1993 | Bullock et al. | 385/100 |

FOREIGN PATENT DOCUMENTS 63-206704 8/1988 Japan.
63-206705 8/1988 Japan.

*Primary Examiner*—Rodney B. Bovernick
*Assistant Examiner*—Robert E. Wise
*Attorney, Agent, or Firm*—Cushman Darby & Cushman

[57] ABSTRACT

A mid-span branching method for an optical path including a multi-fiber optical cable which is constituted by a multi-fiber ribbon with a plurality of optical fibers arranged in a plane and integrated with a common coating, includes the first step of exposing an intermediate portion of the multi-fiber ribbon from the multi-fiber optical cable (step 101), the second step of extracting the exposed multi-fiber ribbon (step 102), the step of separating at least one single-core optical fiber from the extracted multi-fiber ribbon (step 103), and the step of connecting the single-core optical fiber separated from the multi-fiber optical cable to a single-core optical fiber branched from a branch cable (steps 104, 105).

16 Claims, 24 Drawing Sheets

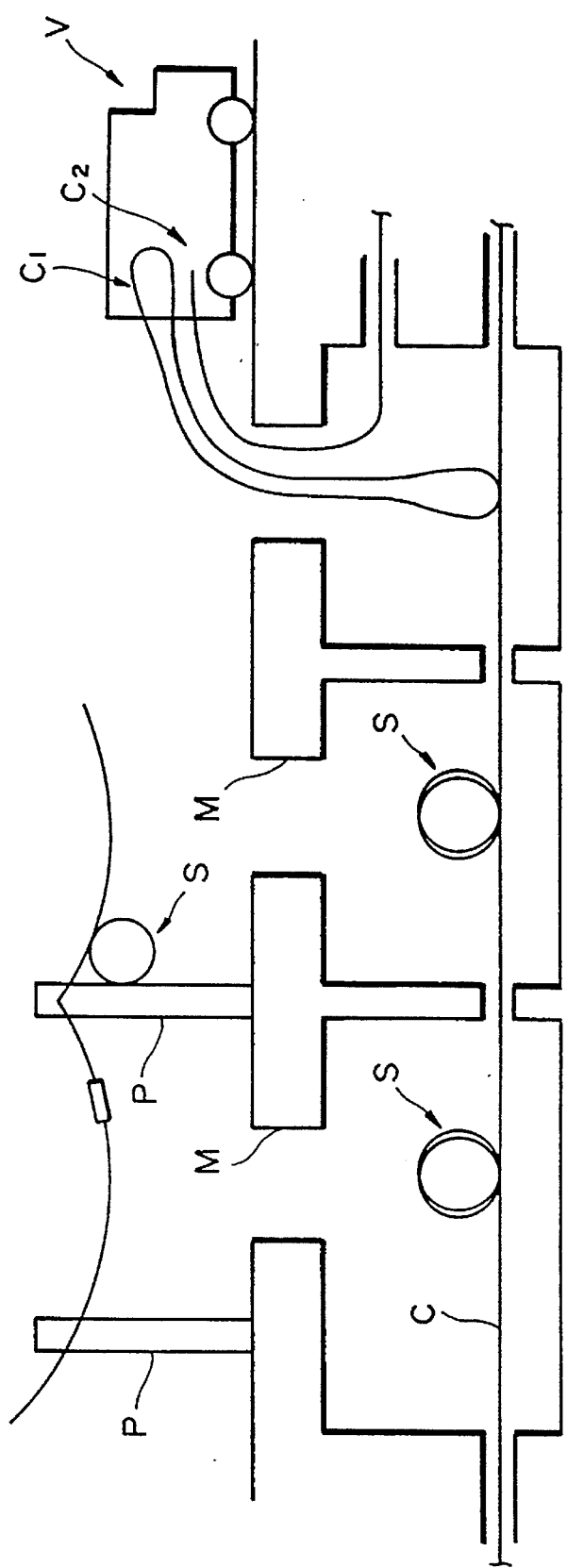

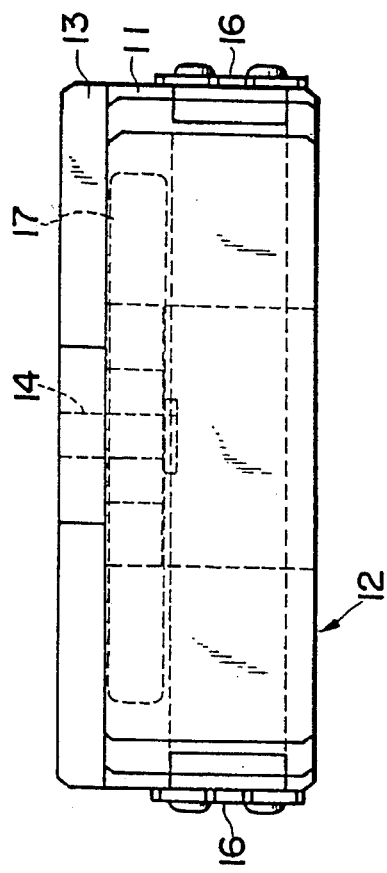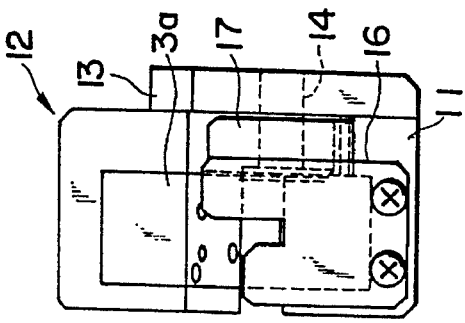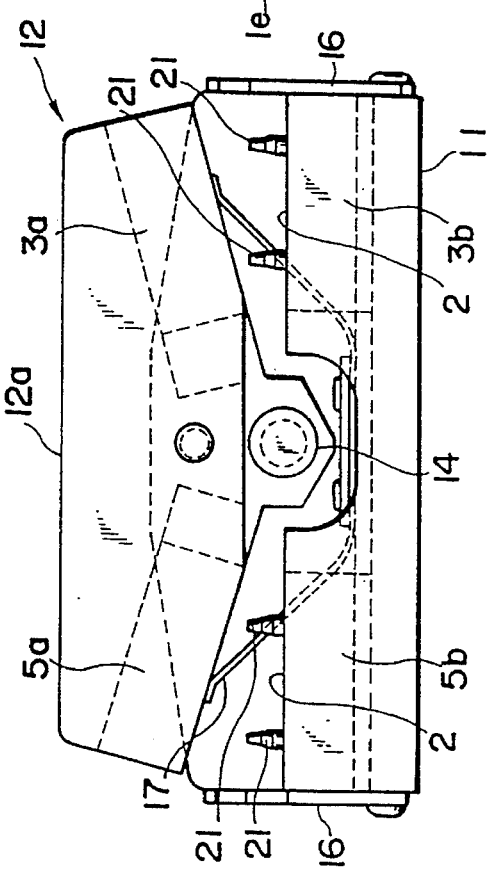

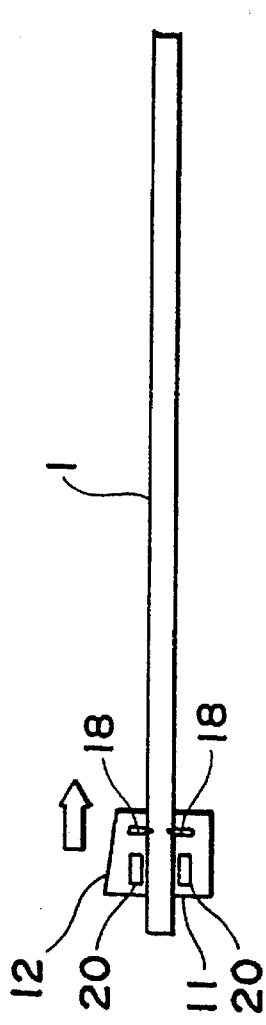
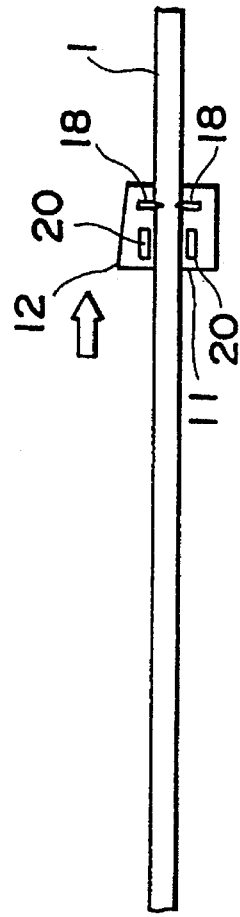
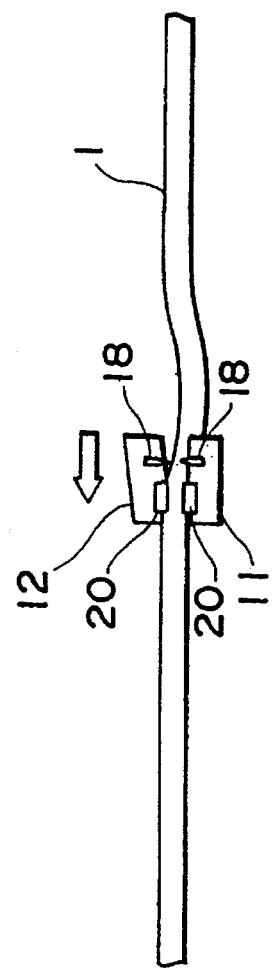
Fig.10A
Fig.10B
Fig.10C

Fig.26A
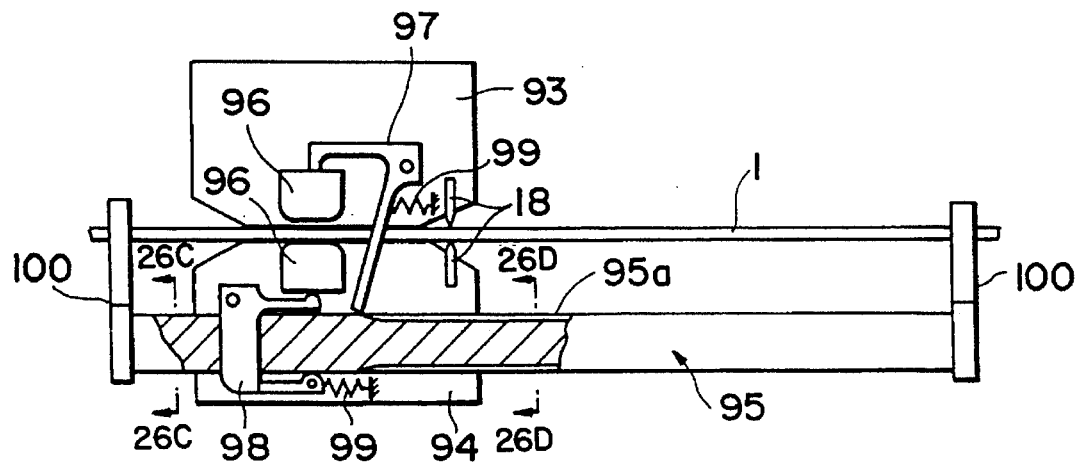
Fig.26B
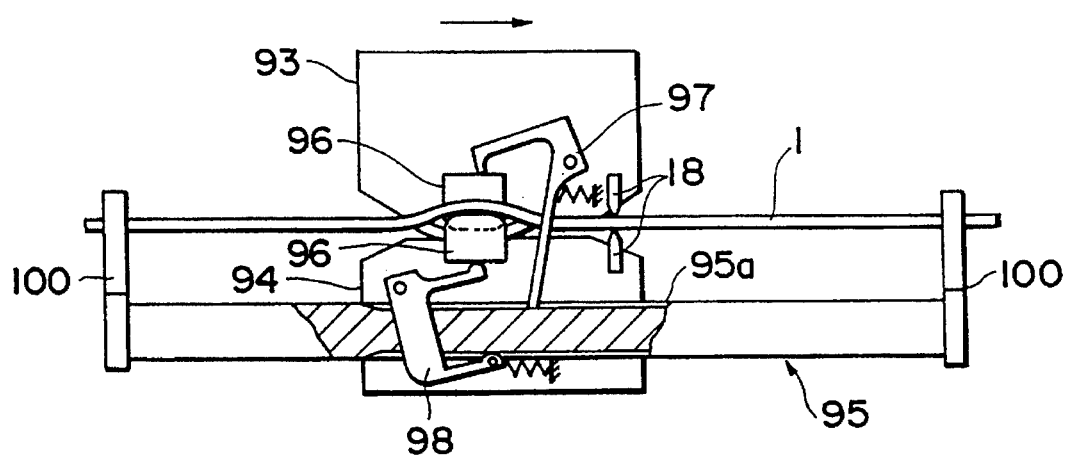
Fig.26C    Fig.26D
 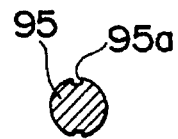

5,530,782

INTERMEDIATE BRANCHING METHOD FOR OPTICAL PATH

BACKGROUND OF THE INVENTION

1. Field of the Invention

The present invention relates to an intermediate branching method (e.g. mid-span branching method) for an optical path including a multi-fiber optical cable constituted by a multi-fiber ribbon with a plurality of optical fibers arranged in a plane and integrated with a common coating.

2. Related Background Art

Sheaves S of an optical cable C are installed in manholes M or near electric poles P in advance for the case of intermediate branching (see FIG. 5). Extra portions of the optical cable C are preserved, e.g., coiled, and stored as the sheaves S. Since the optical cable C has these sheaves S, an intermediate branching operation of the optical cable C is executed smoothly and efficiently.

An actual mid-span branching operation is executed by using an operation vehicle in which connection can be made by using a generator. More specifically, an operation vehicle V is parked near a manhole or an electric pole. One of the sheaves S of the optical cable C is uncoiled, and an obtained optical cable C1 is led into the vehicle. An optical cable C2 to be connected after branching has been led into the vehicle. Operations such as branching, connection, closure mounting, and the like are performed for the optical cables C1 and C2 in the vehicle. When these operations are completed, the optical cable C1 is returned in the manhole M.

As methods of branching an optical cable, a method using a chemical, an inflating method (see FIG. 2 of Japanese Patent Laid-Open No. 63-206704 as shown in FIG. 6A of this application), a planing method (see FIG. 2 of Japanese Patent Laid-Open No. 63-206705 as shown in FIG. 6B of this application), and the like are known.

The method using a chemical is not appropriate for intermediate branching since it chemically damages the common coating of the ribbon with certain chemical. Such chemical damages not only the common coating of the multi-fiber ribbon but also the coatings of the individual optical fibers. Accordingly, an optical fiber which is branched by using a chemical is highly liable to disconnection, and thus its overall long-term reliability after installation is degraded.

The inflating method and planing method can be applied to intermediate branching of an optical cable. However, they can be used only if the common coating of the ribbon to be used has a certain thickness and thus does not easily peel off. Also, the common coating must be removed. Therefore, according to neither method, the multi-fiber ribbon cannot be divided into individual optical fibers efficiently by one step.

Especially, if the multi-fiber ribbon is a 12-fiber ribbon, it has a width of 3 mm, a thickness of 275 μm, and an optical fiber pitch of 250 μm. Then, if the precision is low, the optical fibers can be damaged.

Therefore, a method free from the above-mentioned drawbacks and capable of reliably separating only a specific optical fiber at high precision is sought.

SUMMARY OF THE INVENTION

It is, therefore, an object of the present invention to provide an intermediate branching method such as mid-span branching method capable of reliably branching a multi-fiber ribbon in units of single-core optical fibers at high precision.

In order to achieve the above object, according to the present invention, there is provided an intermediate branching method for an optical path including a multi-fiber optical cable which is constituted by a multi-fiber ribbon with a plurality of optical fibers arranged in a plane and integrated with a common coating, the method including the step of exposing an intermediate portion of the multi-fiber ribbon from the multi-fiber optical cable, the step of extracting the exposed multi-fiber ribbon, the step of separating at least one single-core optical fiber from the extracted multi-fiber ribbon, and the step of connecting the single-core optical fiber separated from the multi-fiber optical cable to a single-core optical fiber separated from a branch cable.

When the single-core optical fiber is separated from the multi-fiber ribbon, a separating tool is used, the separating tool may comprise fiber container such as accommodating means for accommodating a multi-fiber ribbon in a containing area, a fiber holder such as fiber holding means for holding the multi-fiber ribbon in the containing area, a cutter such as scratching means for forming a scratch on a surface of a common coating of the multi-fiber ribbon held by the fiber holder, an arrangement holder such as arrangement defining means for holding the cutter and defining an arranging state of the cutter, and a shearing force applying member such as shearing force applying means for applying a shearing force to the multi-fiber ribbon along the scratch formed by the cutter.

Since the present invention has the above arrangement, an arbitrary multi-fiber ribbon is extracted from a plurality of multi-fiber ribbons included in a multi-fiber optical cable, and an arbitrary single-core optical fiber is separated from this multi-fiber ribbon. The separated single-core optical fiber is connected to a single-core optical fiber extending from a branch cable.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a view showing the state of the mid-span branching operation, FIGS. 6A and 6B include explanatory views showing conventional branching methods (an inflating method and a planing method), FIGS. 7A to 7C include schematic diagrams showing the separating principle of a separating tool that can be used in the present invention, FIGS. 8A to 8C include views showing the first separating tool that can be used in the present invention, FIGS. 9A to 9C include views showing components that can be used in the first separating tool, FIGS. 10A to 10C include step views showing the operation of the first separating tool.

DESCRIPTION OF THE PREFERRED EMBODIMENT

Figure 1:
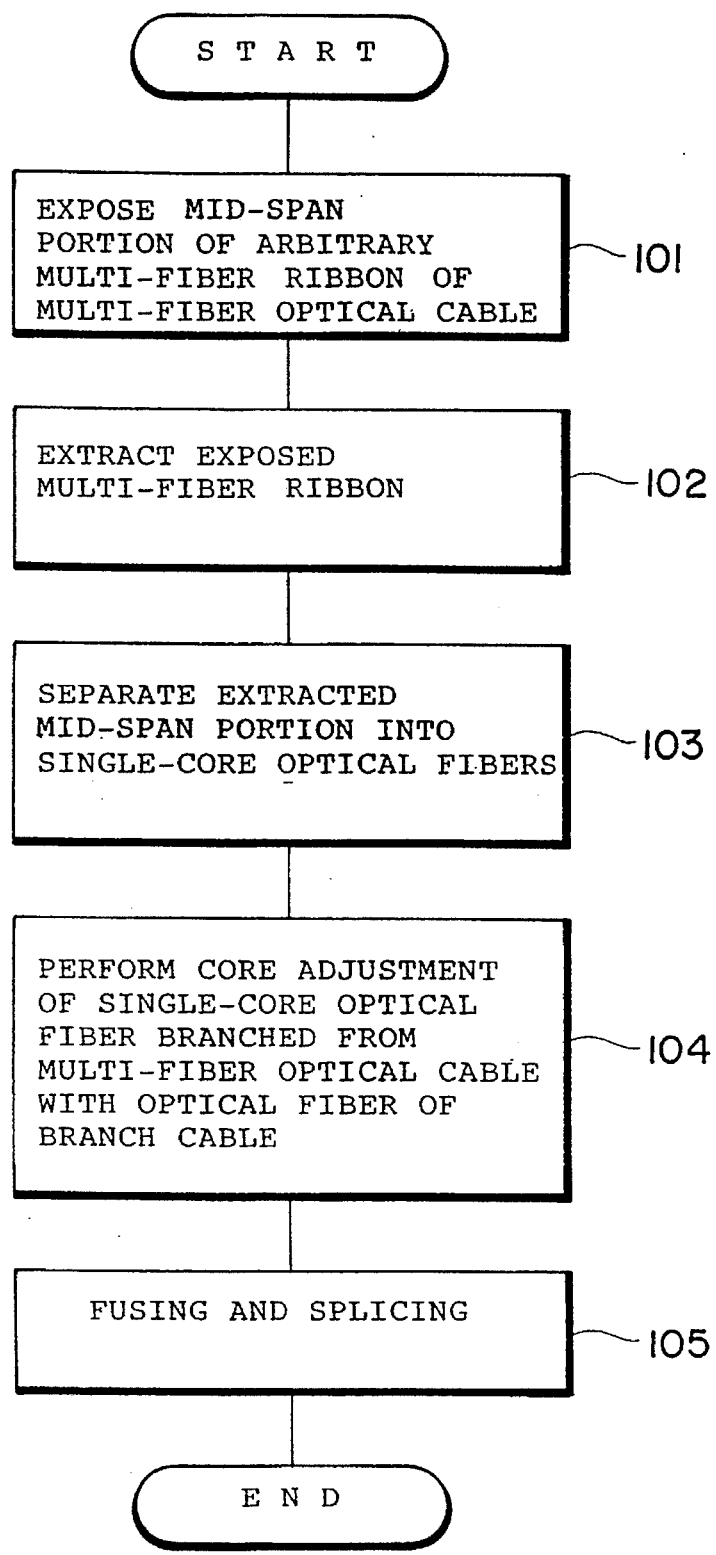
FIG. 1 shows a procedure showing a mid-span branching method according to the first embodiment of the present invention.

A separating tool for a multi-fiber ribbon according to an embodiment of the present invention will be described with reference to the accompanying drawings. In the description of the embodiment, the same elements are denoted by the same reference numerals, thereby avoiding repeated description.

A separating tool that can be used in a branching method according to the present invention will be described first with reference to FIGS. 7A–7C to 27A–27D.

Figure 7A:
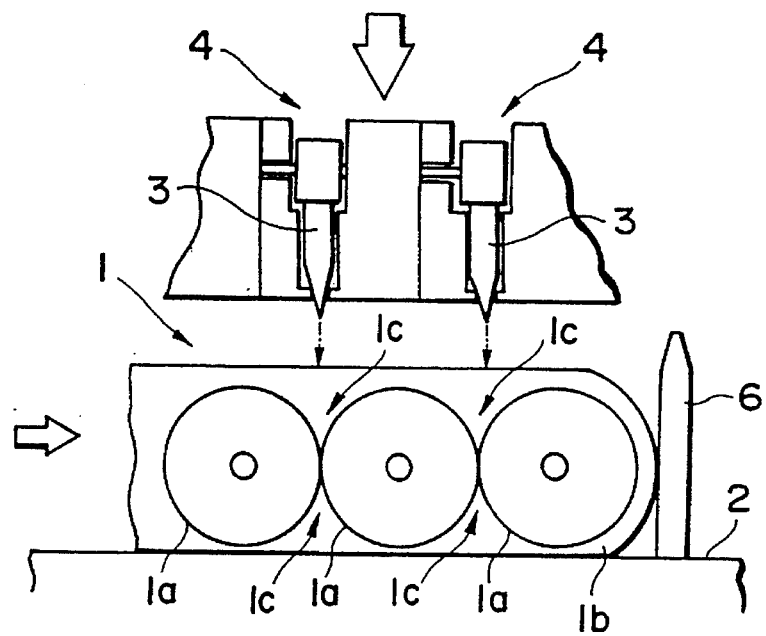
Figure 7B:
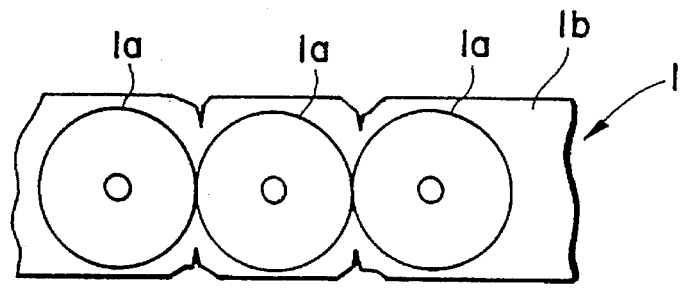
Figure 7C:
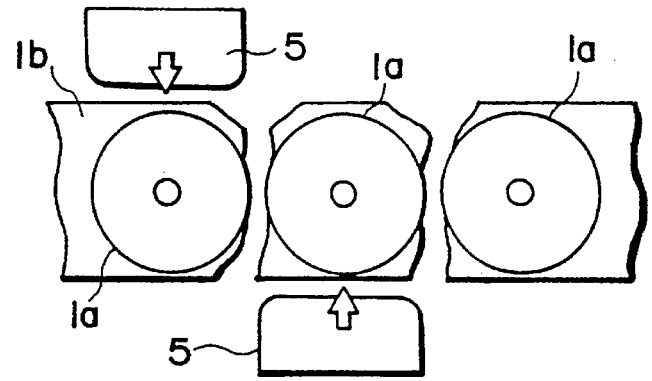

First, the separating principle of the separating tool used in the present invention will be described with reference to FIGS. 7A–7C. FIGS. 7A–7C include schematic diagrams showing the separating principle.

The separating tool that can be used in the present invention is basically constituted to include scratching means 3, arrangement changing means 4, and shearing force applying means 5.

The present invention is effective for any of the following ribbons.

The branching method according to the present invention is useful for an ribbon having a common coating which is thin when compared to the optical fibers included in the fiber wire. For example, this branching method can be applied to an ribbon having a thin common coating of 300 μm or less with respect to an optical fiber having a diameter of 250 μm.

When a conventional separating method (e.g., a planing method) is applied to an ribbon having a thin common coating, the operation becomes difficult, and the single-fiber optical fibers may be damaged.

The branching method according to the present invention is applied to an ribbon in which the adhesion strength (F1) between the fiber coating of a single-fiber optical fiber thereof and the optical fiber in the fiber coating, and the adhesion strength (F2) between the fiber coating and the common coating satisfy F1>F2. To the contrary, if the relationship between F1 and F2 satisfies F1<F2, the coating of the single-fiber optical fiber can be undesirably removed by the adhesion strength of the common coating, thereby damaging the single-fiber optical fiber.

Furthermore, the branching method according to the present invention is useful for an ribbon in which individual single-fiber optical fibers therein have different color coatings. When the conventional branching method is applied to an ribbon having color coatings, if the surface of a fiber coating is damaged, the individual fiber may not be identified.

A multi-fiber ribbon 1 that can be used in the present invention has a structure in which a plurality of optical fibers 1a arranged almost in a row are integrally fixed with a common coating 1b. When this multi-fiber ribbon 1 is inserted in the separating tool of the present invention, it is first arranged at a fiber accommodating area 2. FIG. 7A shows a state wherein the multi-fiber ribbon 1 is arranged at the fiber accommodating area 2. The scratching means 3 is arranged above the fiber accommodating area 2 with a gap therebetween which is at least the thickness of the multi-fiber ribbon 1 or more. The scratching means 3 is mounted to an arrangement defining means 4 detachably or fixedly. Since the arrangement defining means 4 moves in a direction perpendicular to the upper surface of the fiber accommodating area 2, it realizes various type of scratches (e.g., scratches for separation into the same numbers, and scratches for separation into different numbers).

The multi-fiber ribbon 1 is fixed in the fiber accommodating area 2 with a positioning pin 6 projecting within the fiber accommodating area 2 and a fiber holding means (not shown) so that it will not move at least in a direction along which the optical fibers are aligned. In this state, the scratching means 3 is moved downward toward the multi-fiber ribbon 1 to form thrust marks on the surface of the common coating 1b of the multi-fiber ribbon 1, more specifically, in recessed portions 1c formed between the optical fibers (see FIG. 7B). Although these thrust marks are as shallow as not reaching the optical fibers 1a, they are sufficient damages to decrease the shearing strength of the multi-fiber ribbon 1. These thrust marks are enlarged as the scratching means are moved relative to the optical fibers 1a (the scratching means are moved or the optical fibers are moved) in the longitudinal direction of the optical fibers 1a. Thereafter, a shearing force is applied by a pair of shearing force applying means 5, arranged above and below the multi-fiber ribbon 1 to sandwich it, along the enlarged scratches. Since the shearing strength of the multi-fiber ribbon 1 has been weakened by the damages enlarged by the scratching means, the multi-fiber ribbon 1 can be easily separated at desired separating positions (see FIG. 7C).

The separating tool using the above separating principle will be described with reference to FIGS. 8 to 27.

First Separating Tool

Figure 9A:
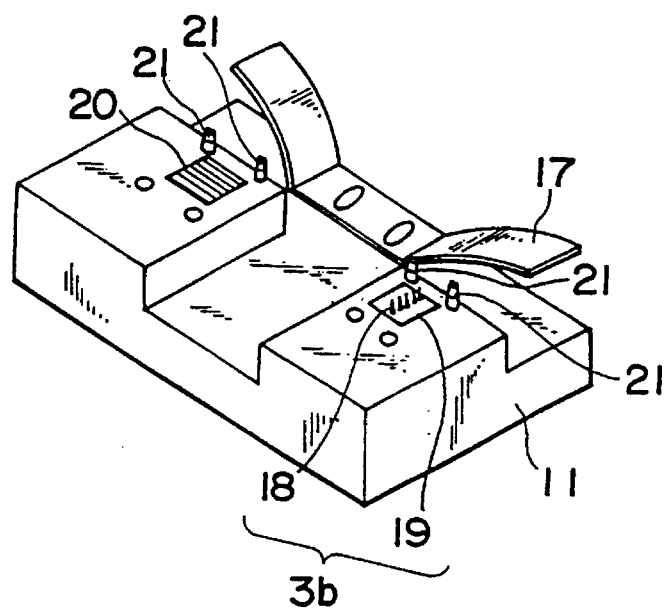
Figure 9B:
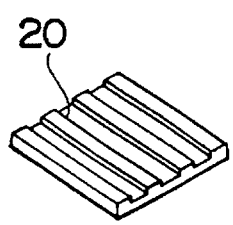
Figure 9C:
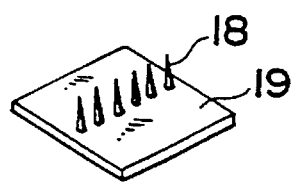

The first separating tool will be described with reference to FIGS. 8A–8C to 10A–10C. FIGS. 8A–8C include views showing the first separating tool, in which FIG. 8A is a plan view, FIG. 8B is a front view, and FIG. 8C is a right-side view of the first separating tool. FIGS. 9A–9C includes perspective views showing components (shearing members, scratching pins, pin arrangement defining members, a plate spring, and the like) that can be used in the separating tool according to the first embodiment. FIGS. 10A–10C include step views showing the function of the separating tool according to the first embodiment.

This separating tool is constituted to include a base member 11, a movable member 12, and a side plate 13. Most of the surface area of the base member 11 forms a fiber accommodating area, and substantially U-shaped members 16 (fiber holding means) are arranged on the two sides of the base member 11. The pair of scratching means 3 and arrangement defining means 4, and the pair of shearing force applying means 5 are arranged on one side (the right side in FIG. 8B) and the other side (the left side in FIG. 8B), respectively, to sandwich the fiber accommodating area 2 along a direction connecting the pair of substantially U-shaped member 16. Therefore, an upper scriber block 3a constituting the scratching means 3 and the arrangement defining means 4 is buried in one side of the lower surface of the movable member 12, and a lower scriber block 3b constituting the scratching means 3 is buried in one side of the upper surface of the base member 11. Similarly, an upper cutter block 5a constituting the shearing force applying means 5 is buried in the other side of the lower surface of the movable member 12, and a lower cutter block 5b constituting the shearing force applying means 5 is buried in the other side of the upper surface of the base member 11.

The side plate 13 is fixed to the rear side portion of the base member 11 with a screw or the like, and the pivotally movable member 12 is axially mounted to the side plate 13 through a shaft 14. The substantially U-shaped members 16 described above are fixed to the two side end portions of the base member 11 with screws or the like (see FIG. 8C). The multi-fiber ribbon 1 is inserted from a front portion through the gap between the base member 11 and the movable member 12, and arranged in the openings of the substantially U-shaped members 16. When the multi-fiber ribbon 1 is arranged in the substantially U-shaped members 16, it is positioned at least at two points. Since the separating tool according to this embodiment is used while the multi-fiber ribbon 1 is pulled by clampers (not shown), positioning at least in the fiber accommodating area 2 is usually realized by two-point positioning. In order to complete two-point positioning, in this embodiment, a plurality of positioning pins 21 are arranged behind the fiber accommodating area 2 (see FIG. 8B). One side of the multi-fiber ribbon 1 portion which is not positioned between the pair of substantially U-shaped members 16 is held by these positioning pins 21.

The movable member 12 is formed to have a substantially pentagonal section (see FIG. 8B). A plate spring 17 is fixed behind the fiber accommodating area 2 of the base member 11 with screws or the like. The two end portions of the plate spring 17 are supported to bias a pair of inclined surfaces constituting the movable member 12 with equal forces. For this purpose, the movable member 12 is maintained such that the gaps between the two end portions of the movable member 12 and the two end portions of the base member 11 (the gap between one end of the movable member 12 and one end of the base member 11, and the gap between the other end of the movable member 12 and the other end of the base member 11) are equal, and its longest side 12a is substantially parallel to the upper surface of the base member 11 (see FIG. 8B).

The upper and lower upper scriber blocks 3a and 3b are constituted to include a plurality of scratching pins 18 and a pin arrangement defining member 19. The scratching pins 18 are mounted to the pin arrangement defining member 19 in accordance with the divisional state of the multi-fiber ribbon, and are exposed in the fiber accommodating area 2 (see FIG. 9C). Shearing member upper and lower dies for applying a shearing force are mounted to the upper and lower cutter blocks, respectively. When these upper and lower dies function in cooperation with each other, a shearing force is applied to the multi-fiber ribbon 1. As the shearing member upper and lower dies (see FIG. 9B), combed blades formed to mesh with each other can be used.

The function of the separating tool according to the first embodiment will be described with reference to FIGS. 8A–8C. The multi-fiber ribbon 1 is set in clampers or the like, and the separating tool is mounted to one end of the multi-fiber ribbon 1. In the mounted state, the movable member 12 is biased by the plate spring 17 so that it is maintained in a horizontal state (the initial state of the separating tool). Thus, even when the separating tool is slid along the multi-fiber ribbon 1, the common coating 1b will not be damaged. However, when the movable member 12 is pivoted to move its one end downward, thereby moving the movable member 12 close to the pin arrangement defining member 19 mounted to the base member 11, the scratching pins 18 are urged against the multi-fiber ribbon 1, thereby forming thrust marks on the common coating 1b (FIG. 10A). The separating tool is slid in the longitudinal direction of the multi-fiber ribbon 1 while the scratching pins 18 thrust on the common coating 1b. By this sliding operation, the formed thrust marks are enlarged, and linear scratches are formed in the common coating 1b of the multi-fiber ribbon 1 (FIG. 10B). Subsequently, the separating tool is returned to the horizontal state, the movable member 12 is pivoted in the opposite direction to move its other end downward, thereby moving the movable member 12 close to shearing members 20 mounted to the base member 11 (FIG. 10C). Then, a shearing force is applied to the multi-fiber ribbon 1 along the scratches, so that the common coating 1b is separated (FIG. 10C). In this state, the separating tool is moved along the multi-fiber ribbon 1. When shearing is completed, the separating tool is returned to the initial state (separation end), and is removed from the separated multi-fiber ribbon 1.

After scratches are formed, the separating tool may be returned to a scratching start point, and shearing may be performed.

Second Separating Tool

Figure 11:
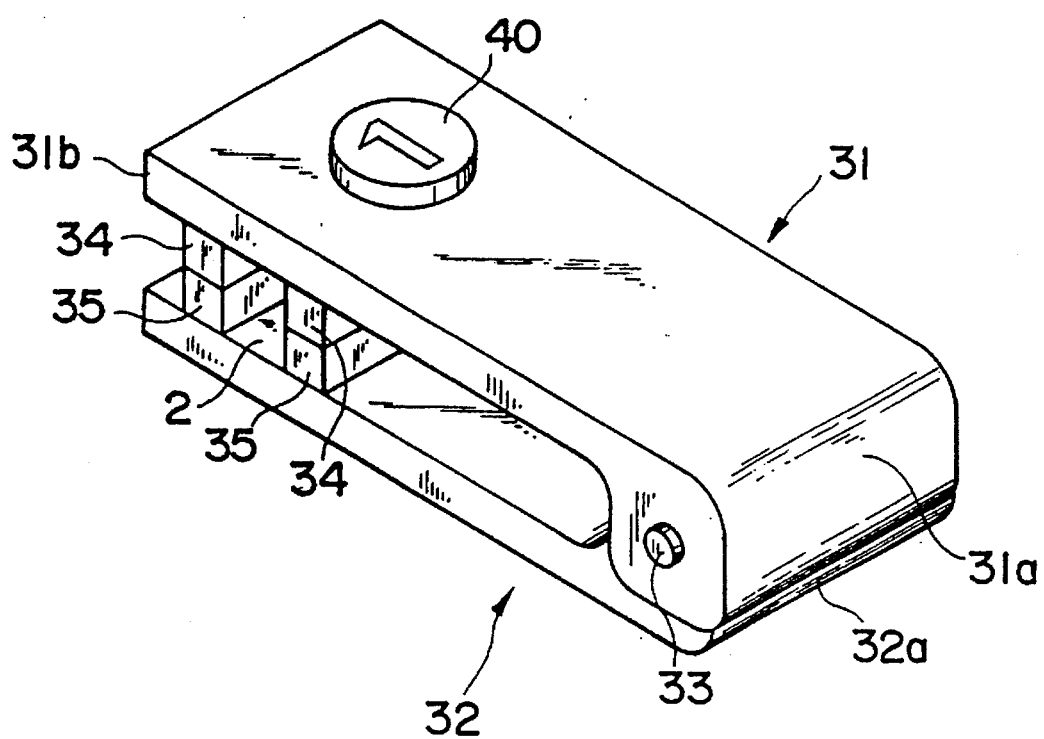
FIG. 11 is a perspective view showing the second separating tool, FIGS. 12A and 12B include explanatory views showing the internal structure of the second separating tool, FIGS. 13A to 13C include views showing a modification of the second separating tool.

The second separating tool that can be used in the present invention will be described with reference to FIGS. 11 to 13A–13C. FIG. 11 is a perspective view showing the second separating tool, FIGS. 12A–12B include explanatory views showing the internal structure of the second separating tool, and FIGS. 13A–13C include views showing a modification of the second separating tool.

This separating tool is constituted to include a first member 31, a second member 32, and a coupling member 33. The coupling member 33 is arranged at one end portion 31a of the first member 31, and the second member 32 is pivotally and axially mounted through the coupling member 33. A pair of first rectangular members 34 are arranged at the other end portion 31b of the inner surface of the first member 31 to face the second member 32, and a pair of second rectangular members 35 are arranged on the inner surface of the second member 32 opposing the first rectangular members 34. The first and second rectangular members 34 and 35 define the fiber accommodating area 2 in which the multi-fiber ribbon 1 is accommodated. The gap between the pair of first rectangular members and the gap between the pair of second rectangular members are almost equal to a width L of the multi-fiber ribbon 1 to be separated.

Figure 12B:
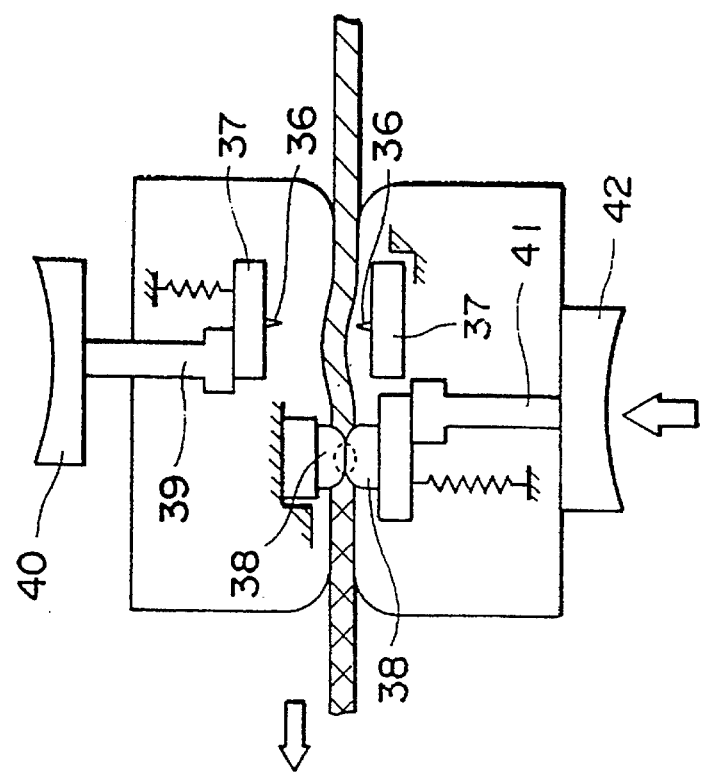
Figure 12A:
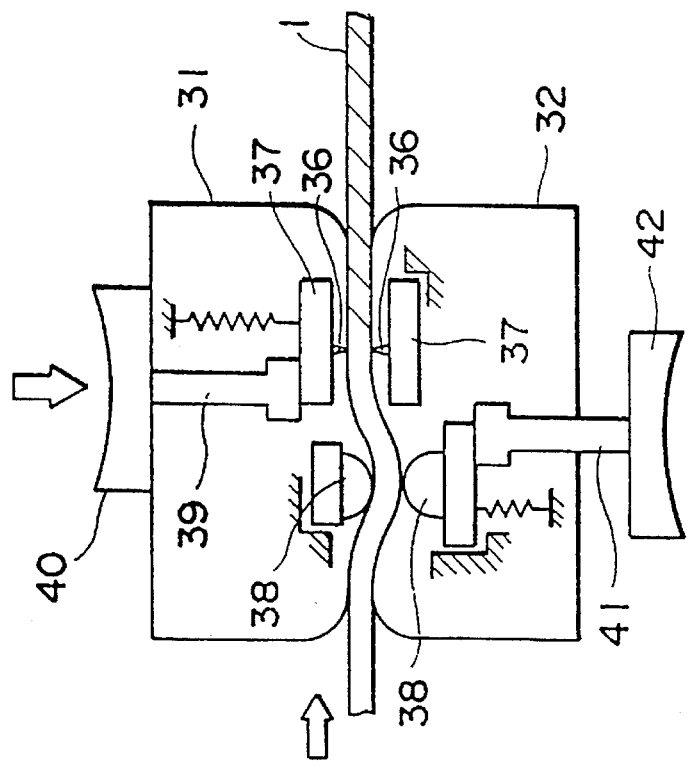

As shown in FIGS. 12A–12B, pin arranging members 37 having scratching pins 36, and shearing members 38 are stored in the first and second members 31 and 32. The pin arranging member 37 mounted to the first member 31 is connected to a first knob member 40, exposed to the surface of the first member 31, through a first coupling member 39. The shearing member 38 mounted to the second member 32 is connected to a second knob member 42, exposed to the surface of the second member 32, through a second coupling member 41. The pin arranging member 37 mounted to the first member 31 is biased by a tension coil spring toward the first knob member 40, and the pin arranging member 37 mounted to the second member 32 is fixed to the second member 32. The shearing member 38 mounted to the second member 32 is biased by a tension coil spring toward the second knob member 42, and the shearing member 38 mounted to the first member 31 is fixed to the first member 31.

Thus, when the first knob member 40 is depressed toward the multi-fiber ribbon 1, the scratching pin 36 mounted to the first member 31 is moved downward to form a thrust mark on the common coating of the multi-fiber ribbon 1 (see FIG. 12A). In this state, when the separating tool is slid along the multi-fiber ribbon 1, the thrust mark formed by the scratching pin 36 is enlarged, thereby forming a linear scratch in the longitudinal direction of the multi-fiber ribbon 1.

Subsequently, when the second knob member 42 is depressed toward the multi-fiber ribbon 1, the shearing member 38 mounted to the second member 32 is moved upward to apply a shearing force along the scratch formed on the common coating of the multi-fiber ribbon 1 (see FIG. 12B). In this state, when the separating tool is slid along the multi-fiber ribbon 1, the shearing region of the multi-fiber ribbon 1 is enlarged, thereby separating the multi-fiber ribbon 1 in the longitudinal direction.

Figure 13A:
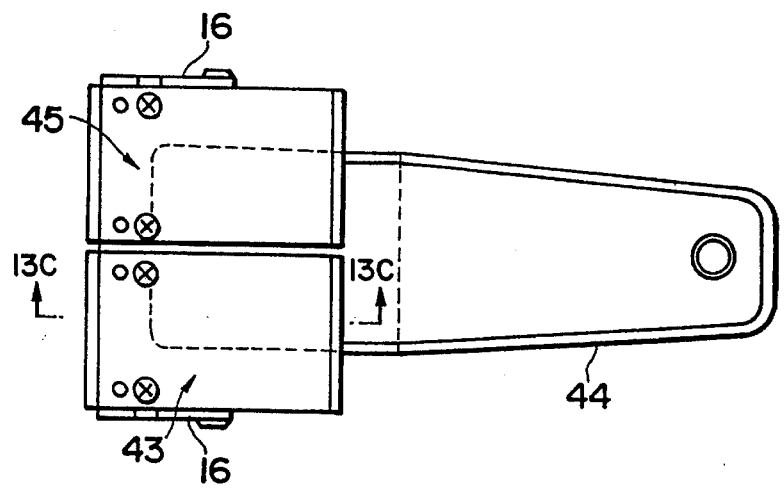
Figure 13B:
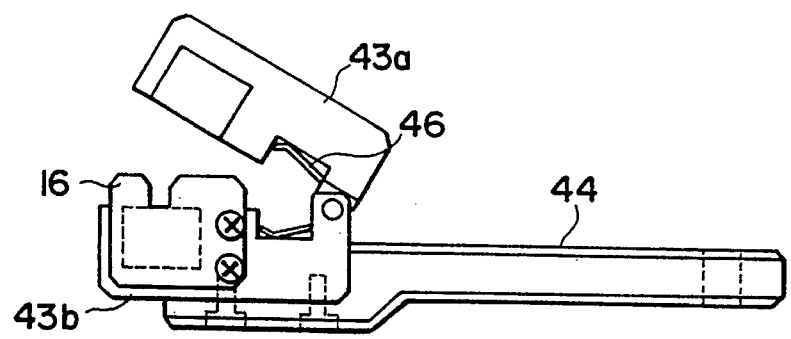
Figure 13C:
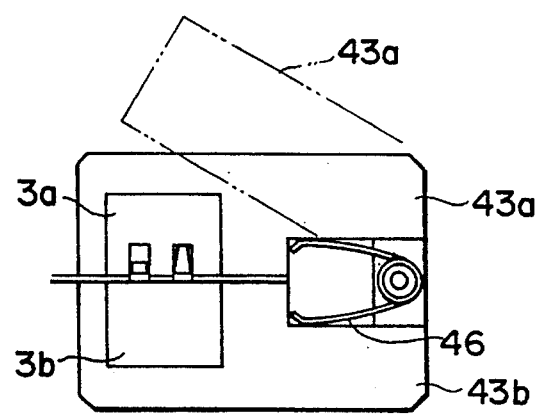

A modification of this embodiment will be described with reference to FIGS. 13A–13C. FIG. 13A is a plan view of a separating tool according to this modification, FIG. 13B is a side view of the separating tool according to this modification, and FIG. 13C is a longitudinal sectional view taken along the plane (C—C) extending across a spring 46 and shows a state wherein upper and lower members are mated.

This separating tool is constituted to include a scriber body (scratching means) 43, a grip 44, a cutter body (shearing force applying means) 45, and the spring 46. An upper scriber block 3a identical to that described above is buried in an upper member 43a of the scriber body 43, and a lower scriber block 3b is buried in a lower member 43b of the scriber body 43 at a position to correspond to the upper scriber block 3a. An upper cutter block 5a identical to that described above is buried in an upper member 45a of the cutter body 45, and a lower cutter block 5b is buried in a lower member 45b of the cutter body 45 at a position to correspond to the upper cutter block 5a. The grip 44 fixes the scriber body 43 and the cutter body 45 with screws or the like. The spring 46 maintains the upper members 43a and 45a and the lower members 43b and 45b in an open state with a predetermined angle. A substantially U-shaped member 16 is fixed to one side surface of the lower member 43b of the scriber body 43 with a screw or the like, and another substantially U-shaped member 16 is fixed to the other side surface of the lower member 45b of the cutter body 45 with a screw or the like (see FIGS. 13A and 13B).

When a multi-fiber ribbon 1 is inserted in the openings of the substantially U-shaped members 16, it is positioned within a fiber accommodating area (not shown). In this state, when the operator depresses the upper member 43a of the scriber body 43 with his thumb or the like, a mark is formed on the multi-fiber ribbon. When the separating tool is moved in the longitudinal direction of the multi-fiber ribbon while maintaining this state, a scriber line is formed. Subsequently, the separating tool is arranged along this scriber line, and the upper member 45a of the cutter body 45 is depressed, thereby applying a shearing force along the scriber line. Since the functions and operations of the scriber body 43 and the cutter body 45 are as described above (see FIGS. 12A–12B), a detailed description thereof will be omitted.

Third Separating Tool

Figure 14:
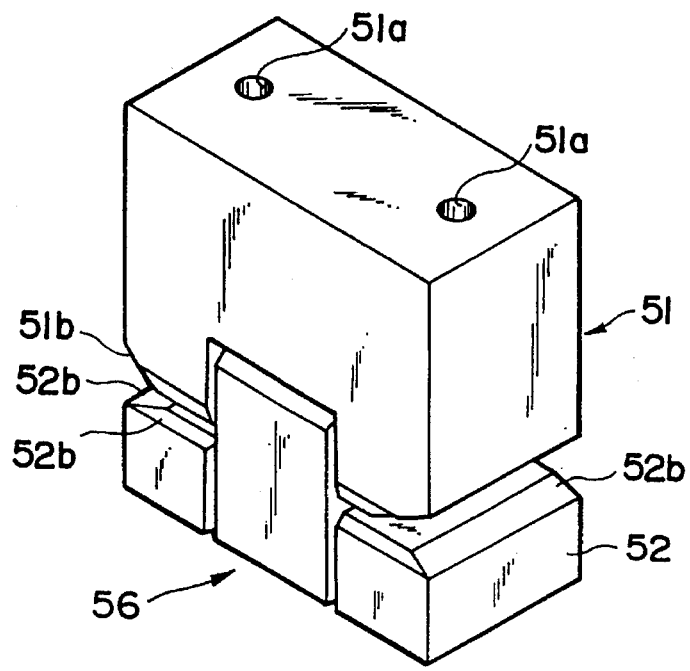
FIG. 14 is a perspective view showing the outer appearance of the third separating tool, FIGS. 15A and 15B include views showing the third separating tool.
Figure 15A:
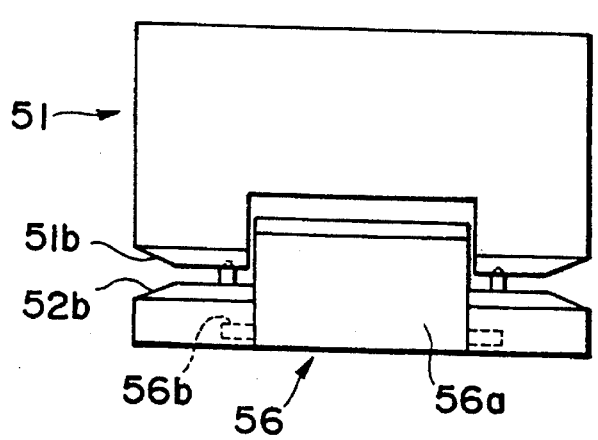
Figure 15B:
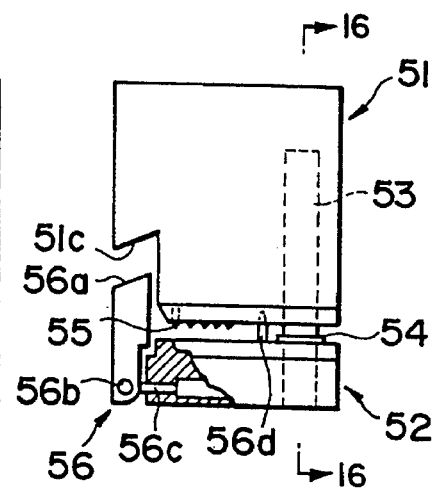
Figure 16:
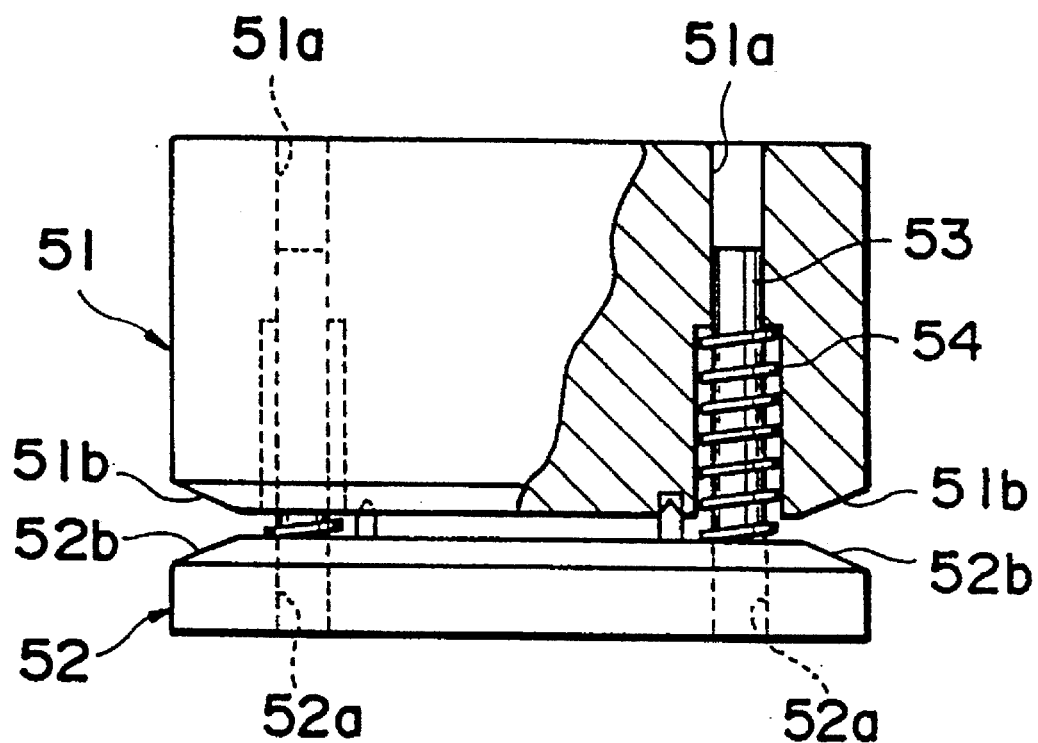
FIG. 16 is a partially sectional view showing the internal structure of the third separating tool, FIGS. 17A to 17C include step views showing an example of a shearing mechanism that can be applied to the third separating tool, FIGS. 18A to 18C include views showing the mounting structure of a shearing member used in the shearing mechanism of FIG. 15 and a timing chart of the same, FIGS. 19A and 19B include step views showing another shearing mechanism that can be used in the third separating tool, FIGS. 20A and 20B include views showing a shearing member that can be used in the shearing mechanism of FIGS. 19A and 19B.
Figure 17A:
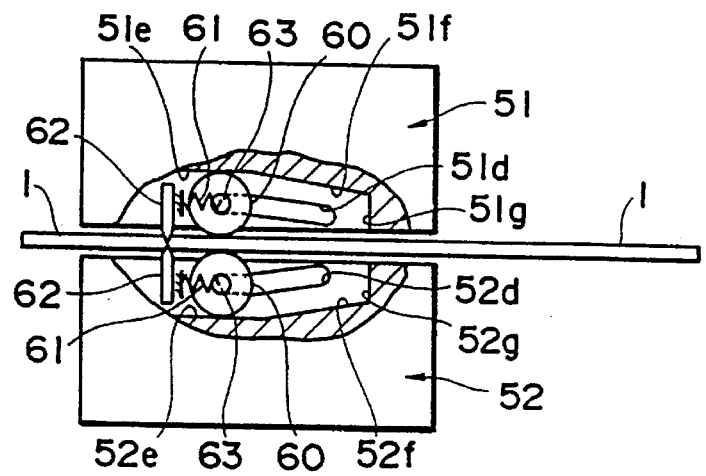
Figure 17B:
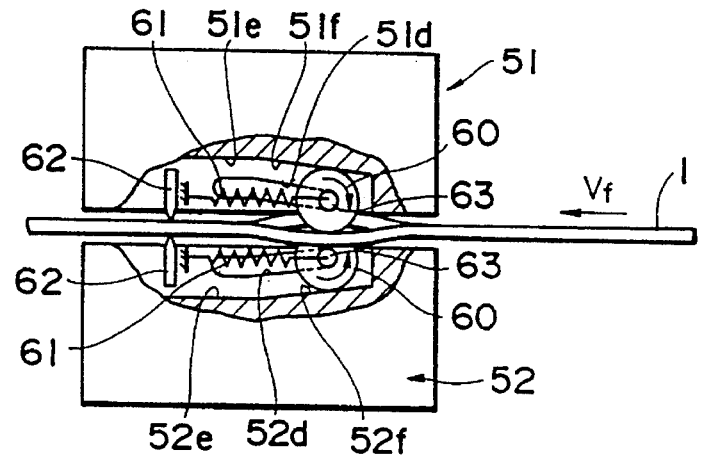
Figure 17C:
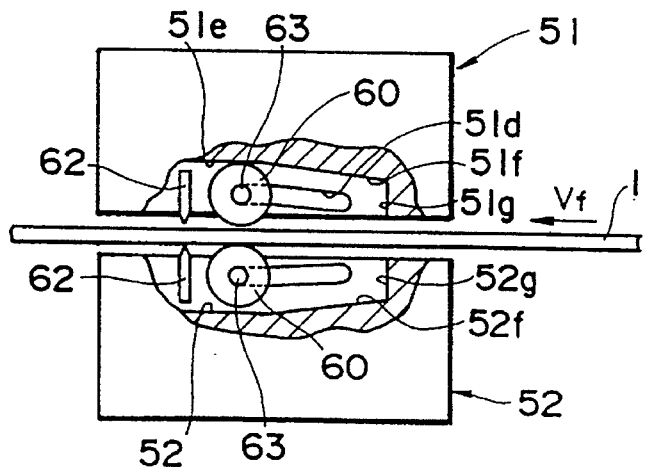
Figure 18A:
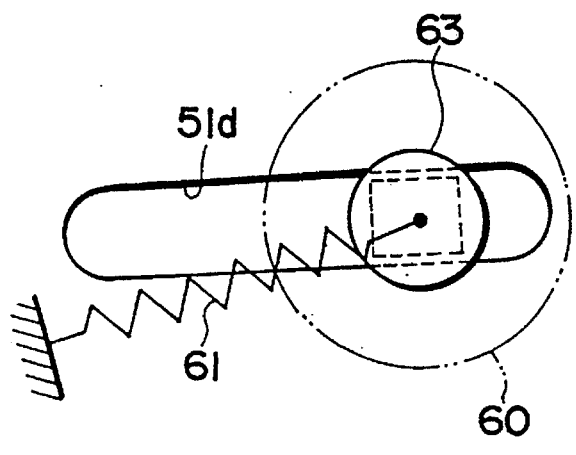
Figure 18B:
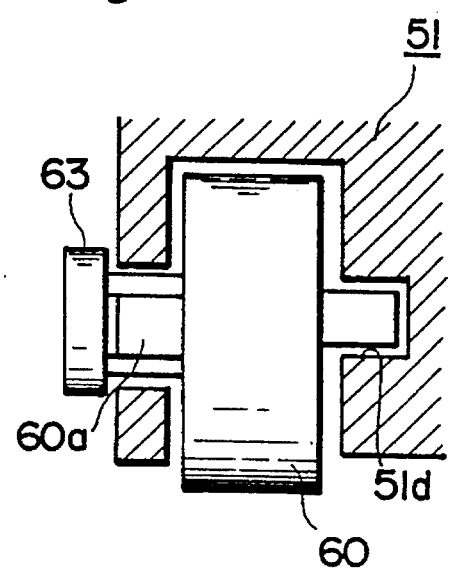
Figure 18C:
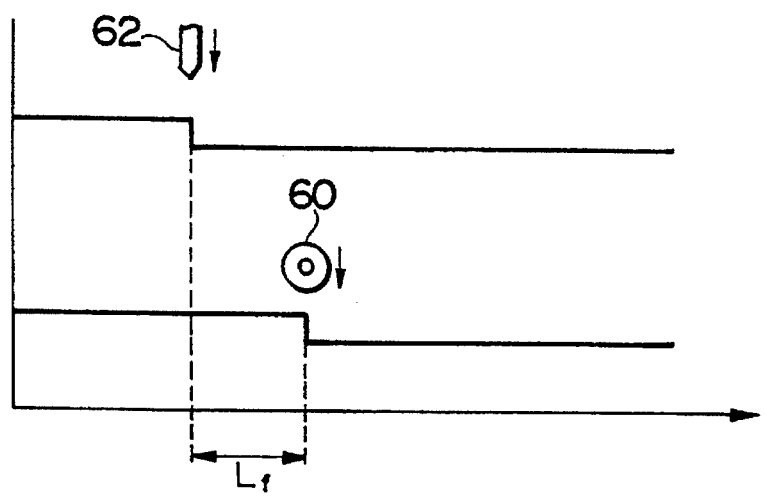
Figure 19A:
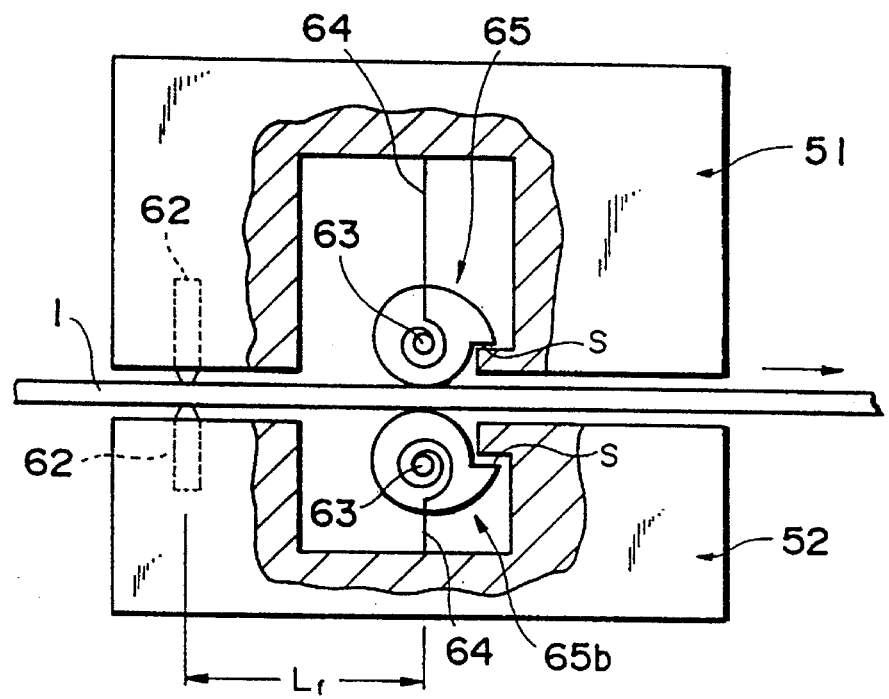
Figure 19B:
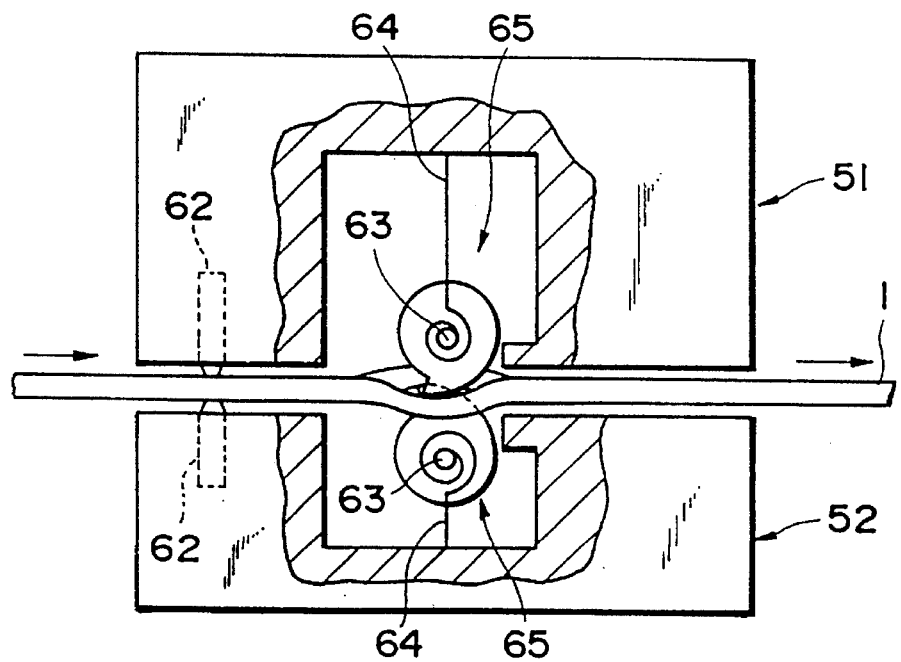
Figure 20A:
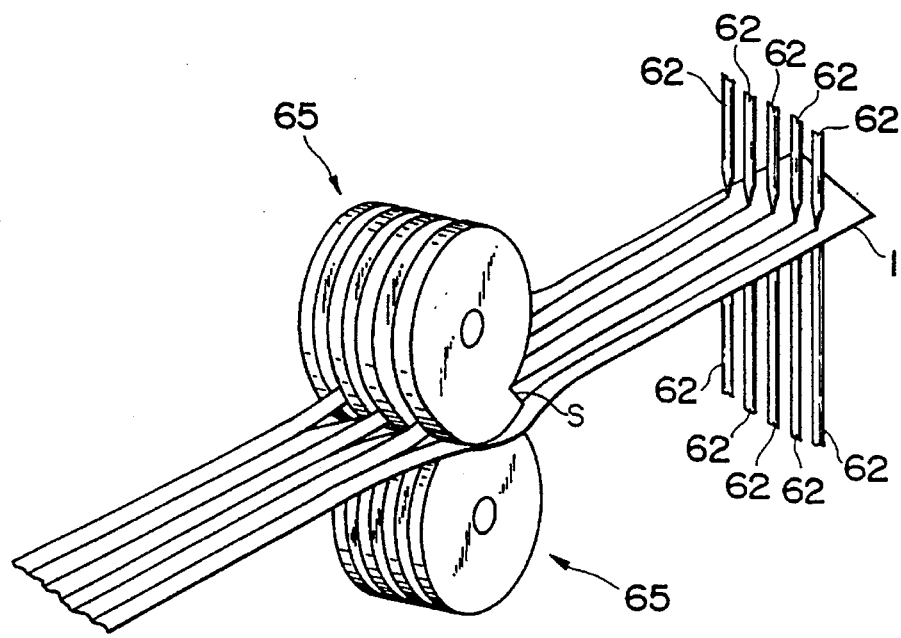
Figure 20B:
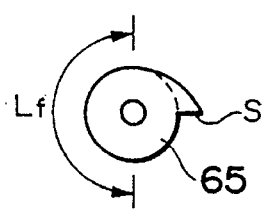

The third separating tool that can be used in the present invention will be described with reference to FIGS. 14 to 20A–20B. FIG. 14 is a perspective view showing the outer appearance of the third separating tool; FIGS. 15A–15B and 16 include partially sectional views showing the outline of this separating tool; FIGS. 17A–17C include partially sectional views showing the internal structure of the third separating tool; FIGS. 18A–18C include views showing the mounting structure of a roller-type shearing member in detail and a timing chart thereof; and FIGS. 19 and 20 include views showing another mounting structure using a spiral shearing member.

This separating tool is constituted to include an upper member 51, a lower member 52, coupling members 53, and a fiber positioning member 56. Holes 51a are formed at the two end portions of the upper member 51 to extend from the upper surface to the lower surface of the upper member 51. Similarly, stepped holes 51a having two types of inner diameters are formed at the two end portions of the lower member 52 to extend from the upper surface to the lower surface of the lower member 52. The coupling members 53 are inserted in these holes 51a and 52a through compression coil springs 54. As a result, the upper member 51 is separated from the lower member 52 by a predetermined gap. This gap can be decreased by depressing the upper member 51 against the biasing force. Scratching pins 55 are mounted on the lower surface of the upper member 51. Thus, after a multi-fiber ribbon 1 is inserted between the upper and lower members 51 and 52 and positioned in the accommodating area, when the upper member 51 is depressed toward the lower member 52, the scratching pins 55 form thrust marks on a common coating 1b of the multi-fiber ribbon 1. In this state, when this separating tool is moved in the longitudinal direction of the multi-fiber ribbon 1, the thrust marks are enlarged.

The fiber positioning member 56 is mounted at the fiber inserting portion of this separating tool. The fiber positioning member 56 is constituted to include a rid member 56a having an inclined distal end, a shaft 56b for pivotally and axially mounting the rid member 56a, and a holding member 56c for holding a closed state wherein the rid member 56a closes the fiber inserting portion. A receptacle portion 51c is formed in the upper member 51 to have a shape matching with the inclined portion of the rid member 56a. When the upper member 51 is moved downward against the compression coil springs 54, the receptacle portion 51c is engaged with the inclined portion of the rid member 56a. As a result, the rid member 56a can be positioned at high precision with respect to the upper and lower members 51 and 52. Positioning is executed immediately before the scratching pins 55 are brought into contact with the common coating 1b of the multi-fiber ribbon 1. Thus, marks are formed at desired positions of the common coating 1b of the multi-fiber ribbon 1 at high precision, and the optical fibers are prevented from accidentally projecting during a scratching or shearing operation.

An example of the mounting structure of a shearing member that can be applied to this separating tool will be described with reference to FIGS. 17A–17C and 18A–18C. This mounting structure uses roller-type shearing members as the shearing force applying means and employs guide grooves and walls and tension coil springs, thereby applying a shearing force along a scriber line formed by a scriber means. Thus, this mounting structure is constituted to include roller-type shearing members 60, guide grooves 51d and 52d, guide walls 51f and 52f, and tension coil springs 61.

Applying mechanisms for applying a shearing force by using the roller-type shearing members 60 are accommodated in the mechanism housing portions of the upper and lower members 51 and 52. The mechanism housing portions are arranged to sandwich the fiber accommodating area. The upper limit of the mechanism housing portion of the upper member 51 is defined by a horizontal wall 51e, the inclined wall 51f, and a vertical wall 51g. Similarly, the lower limit of the mechanism housing portion of the lower member 52 is defined by a horizontal wall 52e, the inclined wall 52f, and a vertical wall 52g. The roller-type shearing members 60 are mounted to be pivotal about caps 63 through roller shafts 60a (see FIG. 18B).

One end of each roller shaft 60a is engaged with the elongated guide groove 51d formed in the side wall of the upper member 51, and the other end of each roller shaft 60a is engaged with the corresponding cap 63. The caps are pulled by the tension coil springs 61 toward scratching means 62. The guide grooves 51d are arranged such that they are closer to the fiber accommodating area as they are separated from the scratching means. Each guide groove 51d has an inclination to guide the corresponding roller shaft 60a such that a shearing force capable of sufficiently shearing the common coating of the multi-fiber ribbon 1 arranged in the fiber accommodating area can be applied when the roller-type shearing member 60 is farthest from the scratching means 62.

The operation of the shearing mechanism will be described with reference to FIGS. 17A–17C by using the roller-type shearing members 60. In a normal state, the roller-type shearing members 60 are closest to the scratching means 62 due to the tension coil springs 61 (see FIG. 17A). When the multi-fiber ribbon 1 is inserted between the pair of roller-type shearing members 60 and the upper member 51 is urged by the lower member 52, the scratching means 62 form marks in the common coating of the multi-fiber ribbon 1. When the multi-fiber ribbon 1 is further fed, the roller-type shearing member 60 of the upper member 51 is rotated due to frictional contact with the multi-fiber ribbon 1, the guide wall 51e, and the inclined wall 51f. Simultaneously, the roller-type shearing member 60 of the lower member 52 is rotated due to frictional contact with the multi-fiber ribbon 1, the guide wall 52e, and the inclined wall 52f, and is moved away from the scratching means 62 against the biasing force of the tension coil spring 61. In this case, the marks formed by the scratching means 62 are enlarged in the longitudinal direction of the multi-fiber ribbon 1. When the multi-fiber ribbon 1 is fed to a certain degree and the scratched portions thereof are brought into contact with the roller-type shearing members 60, the pair of roller-type shearing members 60 overlap. As a result, the common coating of the multi-fiber ribbon 1 is sheared off by the roller-type shearing members 60 (see FIG. 17B). When a force for urging the upper member 51 against the lower member 52 is removed, the upper member 51 is moved away from the lower member 52 due to the operation of the compression coil springs 54. As a result, the roller-type shearing members 60 are separated from the multi-fiber ribbon 1, and the roller-type shearing members 60 move in the guide grooves 51d by the operation of the tension coil springs 61 to be close to the scratching means 62 (see FIG. 17C).

According to this embodiment, when a predetermined period of time elapses after the scratching means 62 scratch the common coating of the multi-fiber ribbon 1, the pair of roller-type shearing members 60 are brought into contact with the multi-fiber ribbon 1, and as a result a shearing force is applied to the multi-fiber ribbon 1. For example, a delay time Tf of application of the shearing force satisfies Tf=(Lf/Vf) where Vf is the feed speed of the multi-fiber ribbon 1 and Lf is the gap between the scratching means 62 and the roller-type shearing members 60 (see FIG. 18C).

Another shearing mechanism that can be applied to the third separating tool will be described with reference to FIGS. 19A–19B and 20A–20B. This shearing mechanism has a characteristic feature in that it employs spiral shearing members 65 and spiral springs 64.

Each spiral shearing member 65 is constituted to include a plate cam which has a stopper S and a profile a radius of which is increased at a predetermined rotational angle (90°) immediately before the stopper S. The spiral shearing member 65 mounted to an upper member 51 is rotatably held through a shaft 63 supported by the side plate of the upper member 51 of the mechanism housing portion, and is biased by the spiral spring 64 to rotate counterclockwise. The spiral shearing member 65 mounted to a lower member 52 is rotatably held by a shaft 63 supported by the side plate of the lower member 52 of the mechanism housing portion, and is biased by the spiral spring 64 to rotate clockwise. Scratching means 62 are arranged at a gap Lf from the corresponding spiral shearing members 65 and apply a shearing force along a plurality of scriber lines formed by the scratching means 62. Thus, the length of the semicircle of each spiral shearing member 65 is equal to the gap Lf (see FIG. 20B), and individual plate cams are arranged at predetermined gaps with each other.

The operation of this shearing mechanism will be described. The spiral shearing members 65 are arranged on the two sides of a multi-fiber ribbon 1 to contact it (see FIG. 19A). When the multi-fiber ribbon 1 is fed out, the spiral shearing member 65 mounted to the upper member 51 is rotated counterclockwise by frictional contact, and the spiral shearing member 65 mounted to the lower member 52 is rotated clockwise by frictional contact. When rotation proceeds to a certain degree, the distal end portion of one spiral shearing 65 overlaps the distal end portion of the other shearing member, thereby applying a shearing force to the common coating of the multi-fiber ribbon 1 (see FIGS. 19B and 20A).

Fourth Separating Tool

Figure 21:
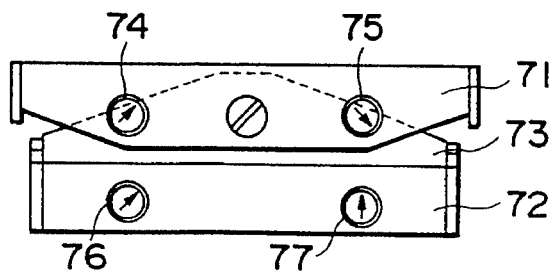
FIG. 21 is a side view showing the outer appearance of the fourth separating tool, FIGS. 22A and 22B include views showing the outline of a scratching pin selecting mechanism of the fourth separating tool, FIGS. 23A to 23G include views schematically showing a divisional state that can be divided by the scratching pins and the shearing member of the fourth separating tool.
Figure 22A:
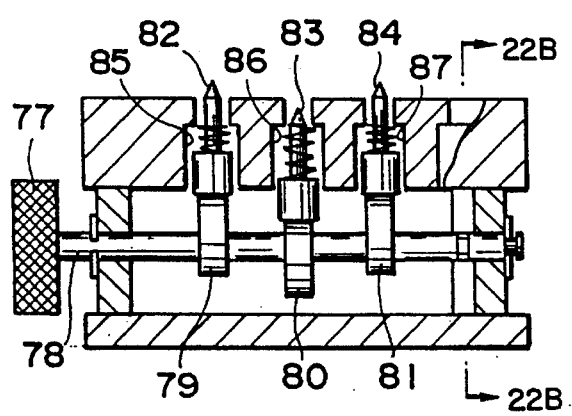
Figure 22B:
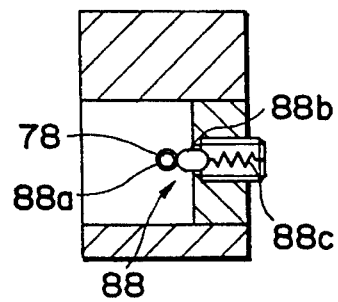
Figure 23A:
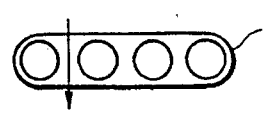
Figure 23B:
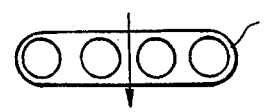
Figure 23C:
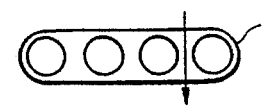
Figure 23D:
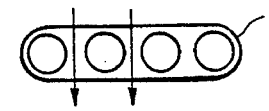
Figure 23E:
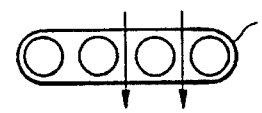
Figure 23F:
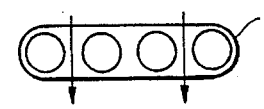
Figure 23G:
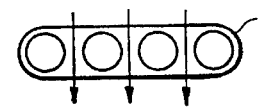
Figure 24:
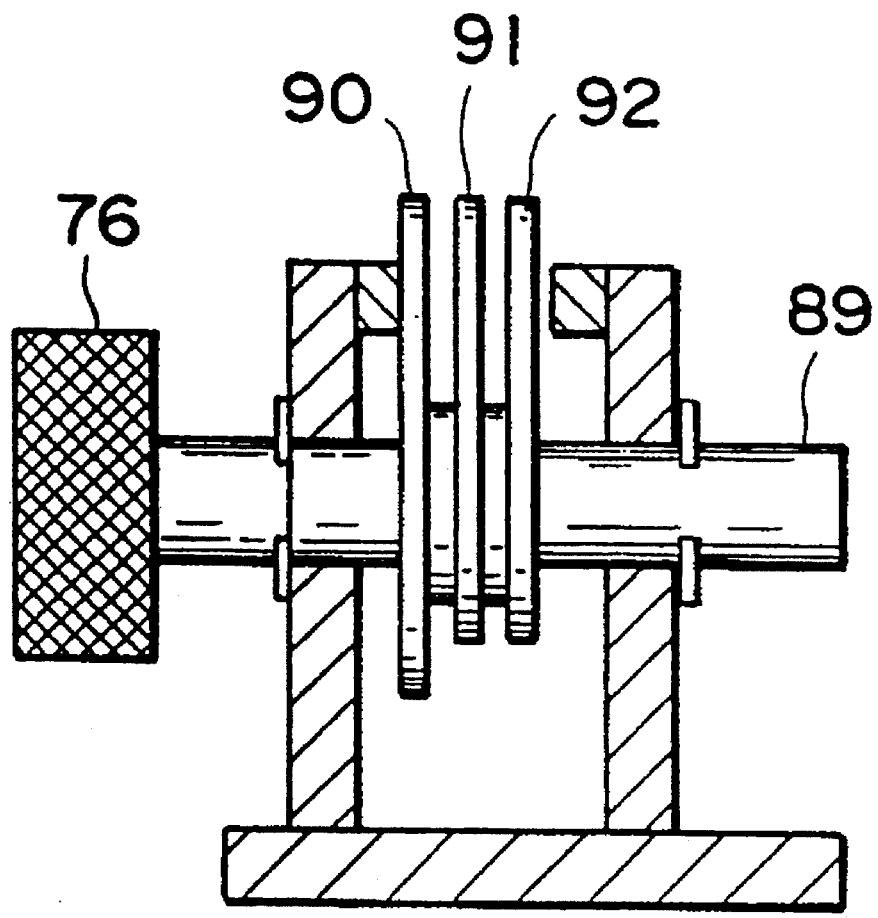
FIG. 24 is a view showing the outline of a shearing member selecting mechanism that can be applied to the fourth separating tool, FIGS. 25A to 25C include views showing the profiles of a plate cam type shearing member used as a plate cam/ shearing member selecting mechanism used by the scratching pin selecting mechanism, FIGS. 26A to 26D include partially sectional views schematically showing the fifth separating tool, and FIGS. 27A to 27D include partially sectional views schematically showing the sixth separating tool.
Figure 25A:
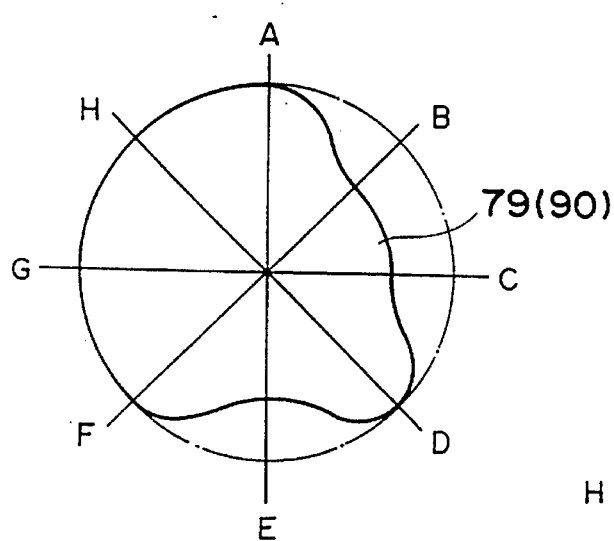
Figure 25B:
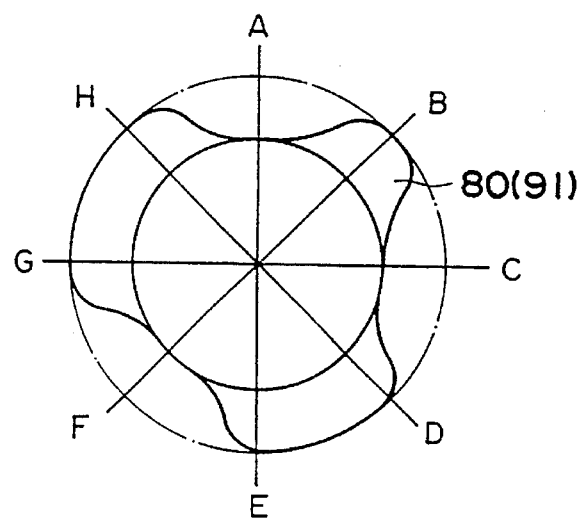
Figure 25C:
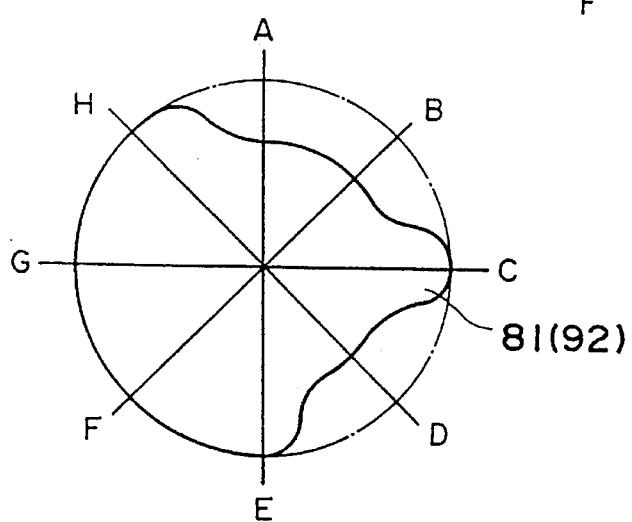

The fourth separating tool that can be used in the present invention will be described with reference to FIGS. 21 to 25A–25C. FIG. 21 is an outer appearance view showing the fourth separating tool; FIGS. 22A–22B include views showing the outline of the scratching pin selecting mechanism of the separating tool; FIGS. 23A–23G include views schematically showing a state which can be divided by the scratching pins and shearing members of the separating tool; FIG. 24 is a view showing the outline of a shearing member selecting mechanism that can be applied to the separating tool; and FIGS. 25A–25C include views showing examples of the profile of a plate cam type shearing member used as a mechanism for selecting a plate cam and a shearing member which is used by the scratching pin selecting mechanism.

This separating tool is constituted to include a first member 71, a second member 72, and a side plate 73 (see FIG. 21). Dial type knob members 74, 75, 76, and 77 are arranged on the front surfaces of the first and second members 71 and 72. A desired pin or shearing member can be projected by rotating these dial type knob members 74, 75, 76, and 77. In this embodiment, the dial type knob members 75 and 77 are used for operating the scratching pins, and the dial type knob members 74 and 76 are used to operate the shearing members. For example, the dial type knob member 77 is connected to a rotation shaft 78, plate cams 79, 80, and 81, and scratching pins 82, 83, and 84 serving as the driven members of the plate cams 79 to 81. These scratching pins 82 to 84 are housed in guide holes 85, 86, and 87 formed toward an accommodating area and biased by springs toward the corresponding cams, so that they are vertically moved in accordance with rotation of the plate cams 79 to 81. When the plate cams 79 to 81 are mowed upward, the corresponding pins project above the accommodating area. Accordingly, if the arrangement pattern of the pins is displayed by the dial type knobs 74 to 77, a desired pin arrangement can be realized easily. Also, this embodiment has a rotational angle holding means 88 for fixing the rotation shaft 78 at predetermined unit angles (e.g., 60° angular pitch). The rotational angle holding means 88 is constituted to include a first engaging portion 88a formed at an intermediate portion of the rotation shaft 78 to have a hexagonal shape, a second engaging portion 88b engaged with the first engaging portion 88a, and a biasing means 88c for biasing the second engaging portion 88b toward the first engaging portion 88a. To realize seven divisional state patterns (FIGS. 23A to 23G), the plate cam 79 having the profile shown in FIG. 25A, the plate cam 80 having the profile shown in FIG. 25B, and the plate cam 81 having the profile shown in FIG. 25C may be used.

The shearing member selecting mechanism will be described with reference to FIG. 24. This shearing member selecting mechanism have a similar mechanism to that of the scratching pin selecting mechanism. For example, the dial type knob member 76 is connected to a rotation shaft 89 having plate cams 90, 91, and 92. The circumferential surfaces of the plate cams 90, 91, and 92 form shearing blades which are partly exposed from the accommodating area in accordance with the rotational angle. To realize the divisional state shown in FIG. 22, plate cam type shearing blades having the profiles shown in FIGS. 25A, 25B, and 25C may be used as the plate cams 90, 91, and 92, respectively.

Fifth Separating Tool

The fifth separating tool that can be used in the present invention will be described with reference to FIGS. 26A–26D. FIGS. 26A–26D include partially sectional views schematically showing the fifth separating tool.

This separating tool is characterized in that shearing processing is automated by using a guide rail, and is constituted to include a first member 93, a second member 94, and a rail member 95. Scratching pins 18 having a structure similar to that described above can be used. Shearing members 96 are respectively mounted to the first and second members 93 and 94, and these shearing members 96 are respectively in contact with a 7-shaped first lever 97 and a U-shaped second lever 98. These levers 97 and 98 are held such that one end portion of each thereof is urged against the rail member 95 by tension coil springs 99. The shearing member 96 is supported by the other end portion of each of the levers 97 and 98 (FIG. 26A). When one end portion of each of the levers 97 and 98 falls in a corresponding groove 95a formed in part of the rail member 95, the shearing members 96 is urged against a multi-fiber ribbon 1 by the other end portion of each of the levers 97 and 98 (see FIG. 26B). As a result, a shearing force is generated in the multi-fiber ribbon 1. Note that clampers 100 are arranged on the two sides of the multi-fiber ribbon 1, and the multi-fiber ribbon 1 is held by the clampers 100 with a predetermined force. In this embodiment, the shearing members 96 are moved in an interlocked manner with fall of the levers 97 and 98 in the grooves 95a. However, this movement can be realized when the levers 97 and 98 escape from the grooves. These operations can be easily realized by altering the internal mechanism. As the mechanism of this type is known, a description thereof will be omitted.

The separating procedure of the separating tool according to this embodiment will be described. First, the separating tool is moved to the origin, the multi-fiber ribbon 1 is clamped by the clampers 100, and the separating tool is closed (see FIG. 26A). Then, the separating tool is slid along the guide rail member 95, thereby moving the separating tool along the multi-fiber ribbon 1. The cam lever 97 of the separating tool is in contact with the rail member 95, and the cam lever 97 falls in the groove 95a during its movement. Thus, shearing separation is automatically started at a desired position only by moving the separating tool along the rail member 95 (FIG. 26B). When separation is completed, the separating tool is opened, and the separated multi-fiber ribbon 1 is removed from the clampers 100.

Sixth Separating Tool

The sixth separating tool that can be used in the present invention will be described with reference to FIGS. 27A–27D. FIGS. 27A–27D include step views showing the operation of the sixth separating tool.

This embodiment is constituted to include a rubber roller 110, a wedge-shape member 111, a movable shaft 112, a shearing member 113, a rubber roller pressing portion 114, and a compression coil spring 115. The wedge-shape member 111 is guided along a guide wall 116 arranged along a multi-fiber ribbon 1, and is biased by the compression coil spring 115 mounted at its end in a direction to separate from the rubber roller pressing portion 114. The rubber roller 110 is rotatably mounted at the distal end of the wedge-shape member 111, and is regulated by the rubber roller pressing portion 114 to move only in the horizontal direction. The rubber roller 110 contacts the multi-fiber ribbon 1 and the rubber roller pressing portion 114, and moves along the rubber roller pressing portion 114 as it is rotated in accordance with the moving amount of the multi-fiber ribbon 1. The shearing member 113, rotatably mounted to the movable shaft 112 which is movable only in a direction substantially perpendicular to the plane of arrangement of the multi-fiber ribbon 1, is arranged at an intermediate portion of the wedge-shape member 111. The shearing member 113 has a disk-like shape, and its peripheral edge forms a shearing blade. The shearing member 113 serves as a kind of a follower with respect to the wedge-shape member 111, and is moved in a direction perpendicular to the moving direction of the wedge-shape member 111. A scratching means 62 for forming a scriber line in the multi-fiber ribbon 1 is arranged upstream the shearing member 113 (the left side in FIGS. 27A–27D) with respect to the feed direction of the multi-fiber ribbon 1.

Figure 27A:
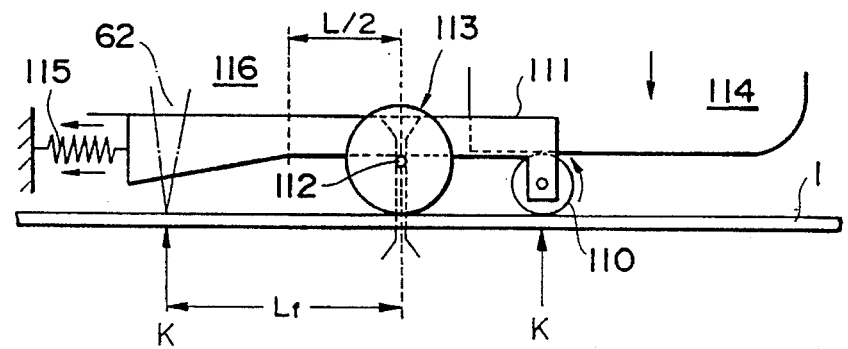
Figure 27B:
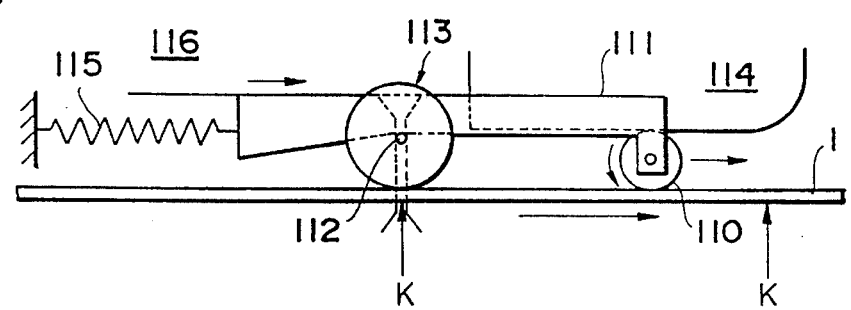
Figure 27C:
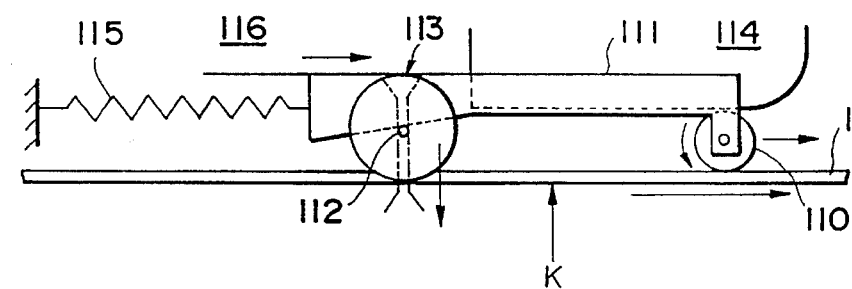
Figure 27D:
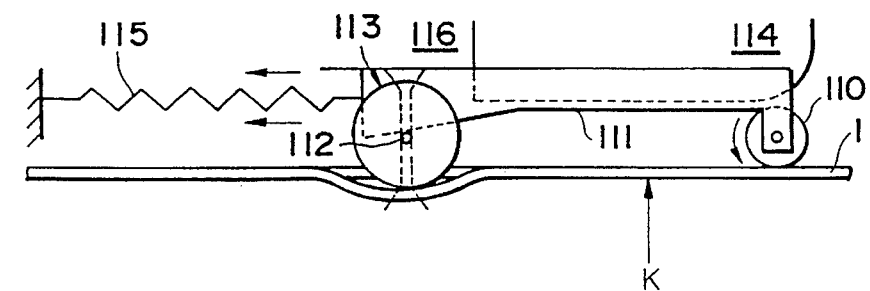

When the multi-fiber ribbon 1 is fed and the scribing start point of the scratching means 62 reaches a position immediately under the shearing member 113 (when the multi-fiber ribbon 1 has moved by Lf), the inclined portion of the wedge-shape member 111 starts to press the shearing member 113 downward (see FIG. 27B). Shearing of the common coating of the multi-fiber ribbon 1 is started at this time point. When the rubber roller 110 is further moved forward, the shearing member 113 is pressed further downward (see FIG. 27C). When the rubber roller 110 reaches the end portion of the rubber roller pressing portion 114, the rubber roller 110 starts idling, and the shearing member 113 continues rotation at the predetermined position (see FIG. 27D). Since the multi-fiber ribbon 1 continues to move forward, the rubber roller 110 continues idling despite that it is pulled to the left by a spring force, and does not return to the origin (point K'). When the multi-fiber ribbon 1 is taken out, the rubber roller 110 and the wedge-shape member 111 return to the origin.

The separating apparatus according to this embodiment can automatically form a scriber line in the common coating of the multi-fiber ribbon 1 by moving the multi-fiber ribbon 1, and can divide the multi-fiber ribbon 1 along this scriber line in a desired divisional state.

A branching method according to the first embodiment of the present invention will be described with reference to FIGS. 1 and 3. The first embodiment shows a mid-span branching method for branching between an optical cable C1 including a plurality of multi-fiber ribbons 1 and a branch cable C2 accommodating a plurality of optical fiber wires 1a.

FIG. 1 includes step views showing the branching method for an optical path according to the first embodiment, and FIG. 3 includes step views corresponding to the first embodiment.

Figure 3A:
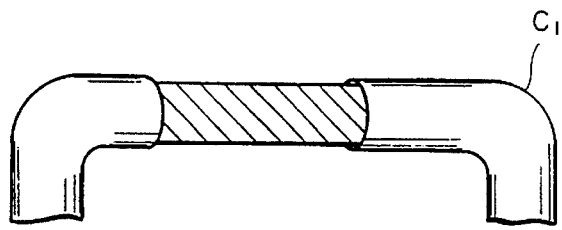
Figure 3B:
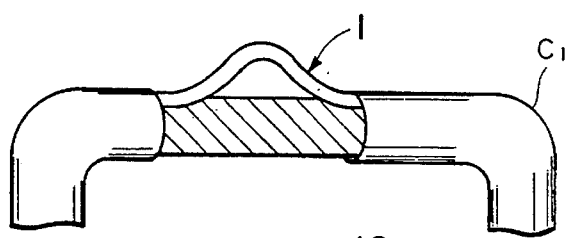
Figure 3C:
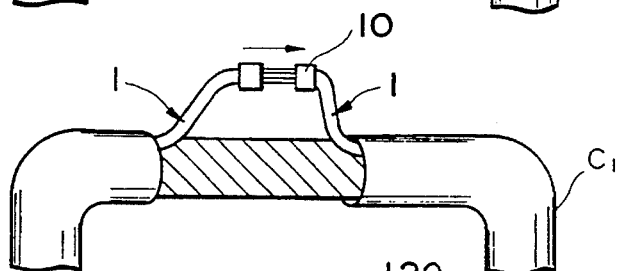

First, a sheaf provided near a utility pole or in a manhole is uncoiled, and an intermediate portion of an arbitrary multi-fiber ribbon 1 of the multi-fiber optical cable C1 is exposed, as shown in FIG. 3A (step 101). For example, a slot type optical cable can be used as the multi-fiber optical cable C1. As the multi-fiber ribbon 1 is not fixed in the multi-fiber optical cable C1, it can be freely extracted by removing the cladding layer. Subsequently, as shown in FIG. 3B, the exposed multi-fiber ribbon 1 is extracted (step 102), and as shown in FIG. 3C, a desired single-core optical fiber is separated from the extracted intermediate portion by using a separating tool 10 (step 103).

Regarding the state of separation/division to which the present invention can be applied, in addition to uneven division for dividing one or two single-core optical fibers from the whole multi-fiber ribbon, even division is also possible. An example of even division includes a state wherein 12 fibers are divided by 12 in units of 1 fiber, a state wherein 12 fibers are divided by 6 in units of 2 fibers, a state wherein 12 fibers are divided by 4 in units of 3 fibers, a state wherein 12 fibers are divided by 3 in units of 4 fibers, and a state wherein 12 fibers are divided by 2 in units of 6 fibers. An example of uneven division includes a state wherein 1 fiber is separated from 12 fibers, a state wherein 12 fibers are separated into 2 fibers and 10 fibers, and a state wherein the second and fourth single-core optical fibers are separated from 12 fibers.

A target divisional state can be easily realized by changing the arrangement of the scratching means 3 of the arrangement defining means 4 (see FIGS. 9A–9C) or of the scratching pins 18 of the arrangement defining member (FIG. 9C). Since the scratching means and the pins are arranged at least at a gap corresponding to the pitch of the optical fibers in the direction along which the fibers are arranged in a multi-fiber ribbon, scratching can be performed without damaging individual optical fibers.

In this case, when a structure comprising a lower die in which a plurality of combed blades are arranged and an upper die in which a plurality of grooves are arranged is used as the shearing force applying means, an arbitrary single-core optical fiber can be separated by adjusting the numbers of the combed blades and grooves. When a plate cam type shearing member is used (FIGS. 21 and 24), as an arbitrary one of the shearing members 90 to 92 can be caused to project into the fiber treating area, a desired divisional state can be easily realized by adjusting the dial type knob 76.

Figure 3D:
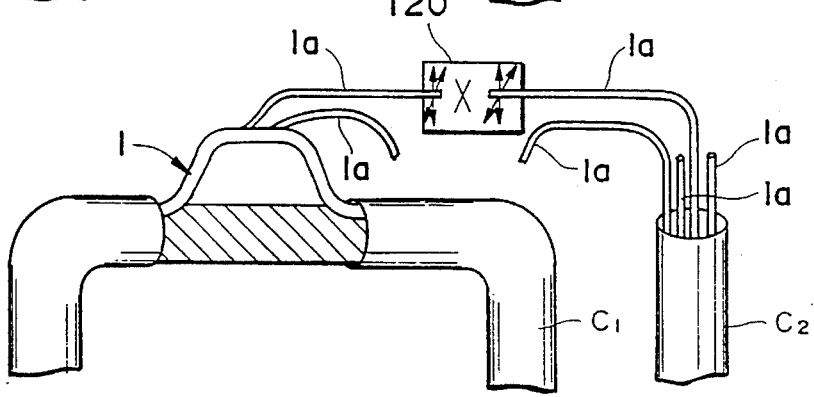
Figure 3E:
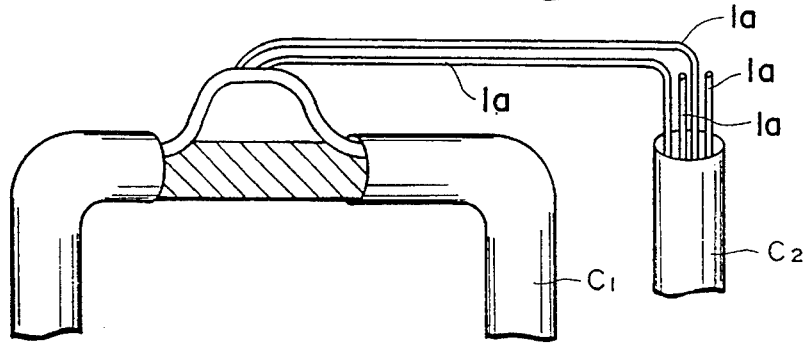

A branch cable C2 accommodating a large number of optical fiber wires 1a is prepared, and an optical fiber wire 1a of the branch cable C2 and a single-core optical fiber 1a separated from the multi-fiber optical cable C1 are core-aligned (step 104). As a core aligning method, a conventional method (e.g., one described in Japanese Patent Laid-Open No. 61-163304 and U.S. Pat. No. 4,878,933 which is a corresponding application of the Japanese Patent Laid-Open No.61-163304) can be used. Finally, as shown in FIG. 3D, fusing connection, e.g., air discharge, by using a fusing machine 120, or fusing connection as mechanical splice is performed (step 105). Through the above steps, connection of the single-core optical fiber 1a extracted from the intermediate portion of the optical cable C1 and the optical fiber wire 1a extracted from the end portion of the branch cable C2 is completed (FIG. 3E).

The second embodiment of the present invention will be described with reference to FIGS. 2 and 4A–4E. The second embodiment shows a mid-span branching method for branching between an optical cable C1 including a plurality of multi-fiber ribbons 1 and a branch cable C2 accommodating a plurality of multi-fiber ribbons 1.

Figure 2:
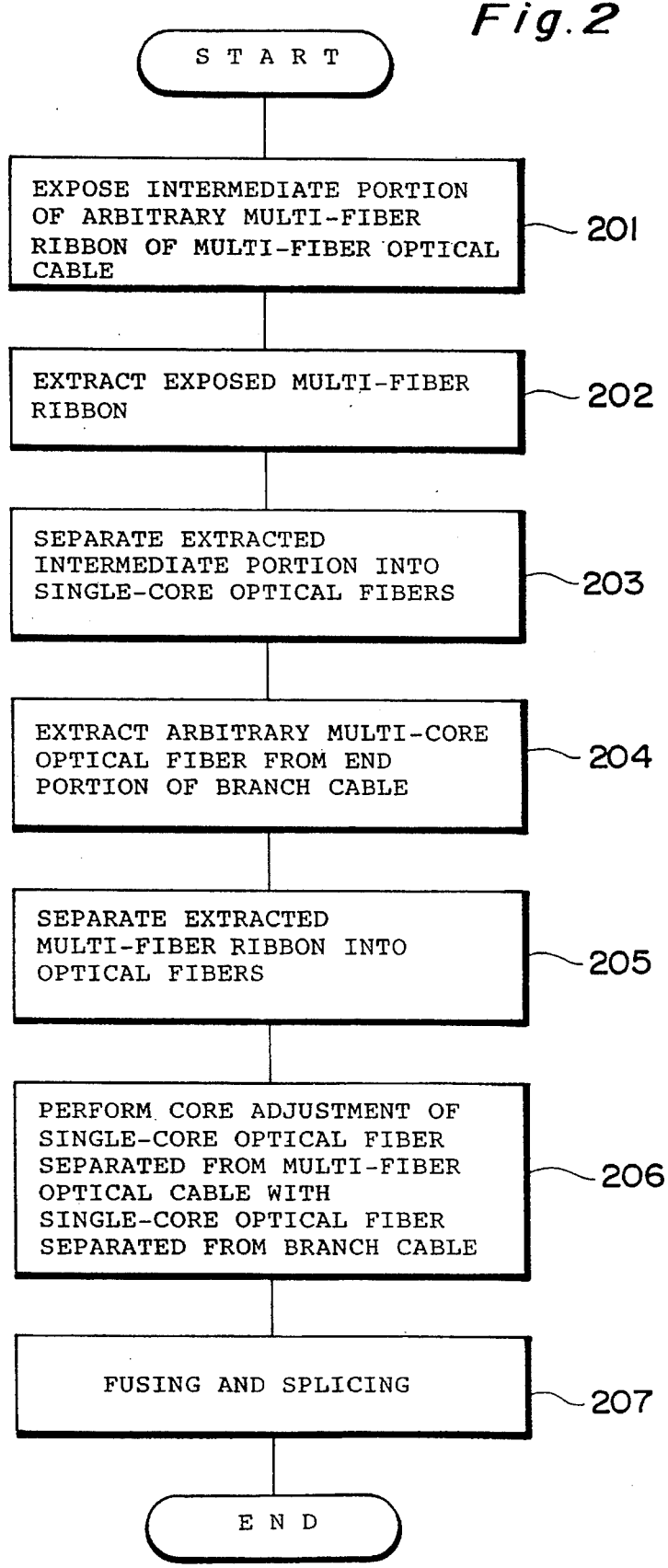
FIG. 2 shows a procedure showing a mid-span branching method according to the second embodiment of the present invention, FIGS. 3A to 3E include step views schematically showing the mid-span branching method according to the first embodiment of the present invention, FIGS. 4A to 4G include step views schematically showing the mid-span branching method according to the second embodiment of the present invention.

FIG. 2 is a flow chart showing the optical path branching method for an optical path according to the second embodiment, and FIGS. 3A–3E include step views corresponding to the second embodiment.

Figure 4A:
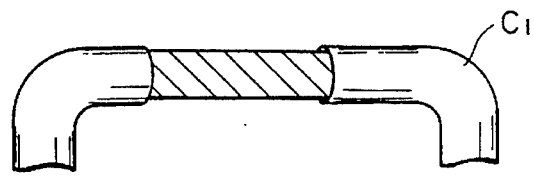
Figure 4B:
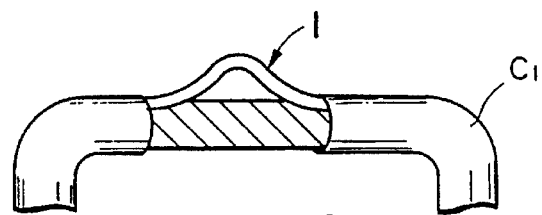

First, as shown in FIG. 4A, an intermediate portion of an arbitrary multi-fiber ribbon 1 of the multi-fiber optical cable C1 is exposed (step 201). Then, as shown in FIG. 4B, the exposed multi-fiber ribbon 1 is extracted (step 202).

Figure 4C:
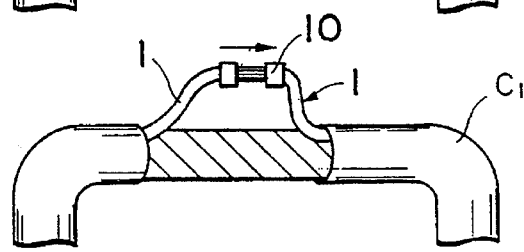
Figure 4D:
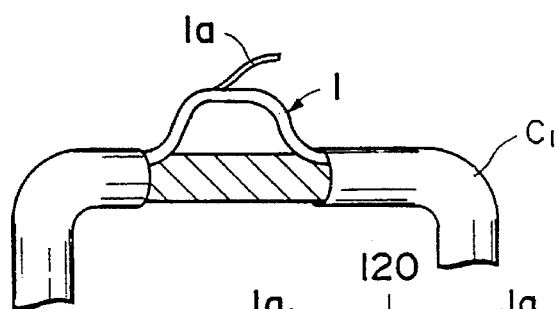

Thereafter, as shown in FIGS. 4C and 4D, the extracted intermediate portion is separated into a desired number of single-core optical fibers by using the separating tool 10 (step 203).

Figure 4G:
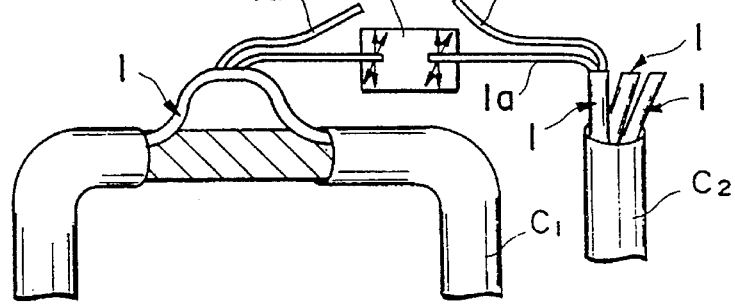
Figure 4E:
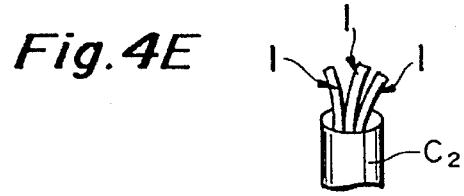
Figure 4F:
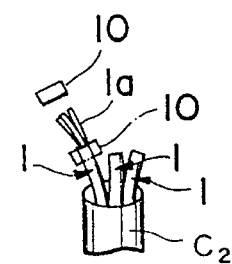
Figure 6A:
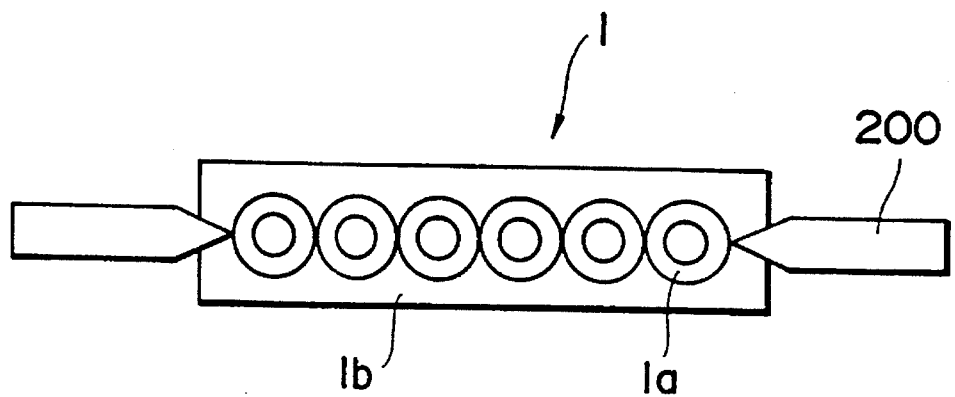
Figure 6B:
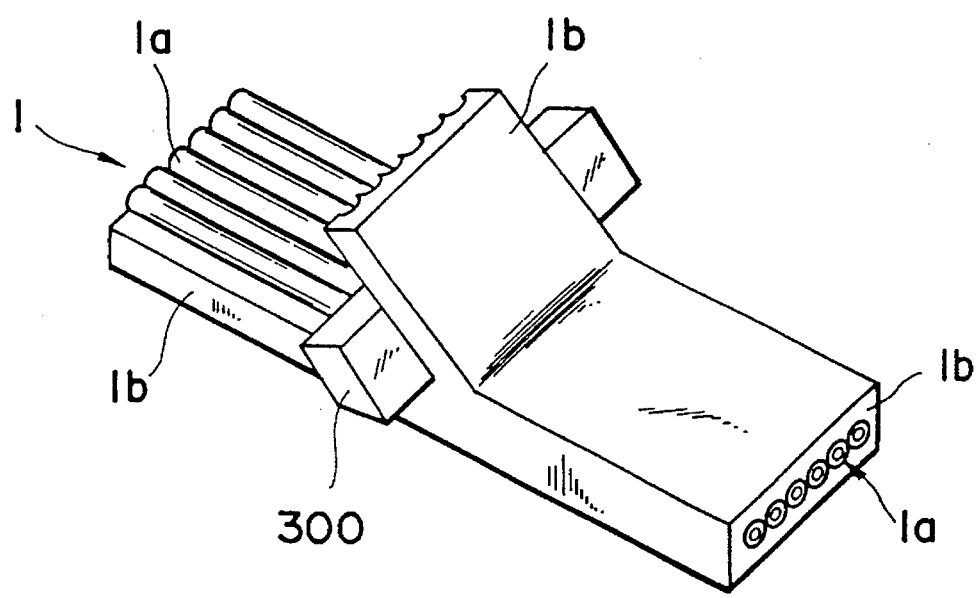

Subsequently, the branch optical cable C2 housing the large number of multi-fiber ribbons 1 is prepared (FIG. 4E), and an arbitrary multi-fiber ribbon 1 is extracted from the end portion of the branch cable C2 (step 204). Thereafter, this multi-fiber ribbon 1 is separated into single-core optical fibers 1a by using the separating tool 10 in the same manner as described above (FIG. 4F). Furthermore, the single-core optical fiber wire 1a obtained from the end portion of the branch cable C2 and the single-core optical fiber 1a obtained from the multi-fiber optical cable C1 are core-aligned (step 206). As a core aligning method, a conventional method (e.g., one described in Japanese Patent Laid-Open No. 61-163304 and U.S. Pat. No. 4,878,933 which is a corresponding application of the Japanese Patent Laid-Open No. 61-163304) can be used. Finally, as shown in FIG. 4G, fusing connection is performed by using a fusing machine 120 (step 207). Through the above steps, connection of the single-core optical fiber 1a extracted from the intermediate portion of the optical cable C1 and the optical fiber wire 1a extracted from the end portion of the branch cable C2 is completed (FIG. 3E).

Since the present invention has an arrangement as described above, it can branch a desired single-core optical fiber from a multi-fiber optical cable at high precision and can branch a desired single-core optical fiber from a multi-fiber branch cable at high precision.

The present invention is not limited to the above embodiments. For example, in the second embodiment, first, a single-core optical fiber is branched from a multi-fiber optical cable, and thereafter a single-core optical fiber is branched from a branch cable. However, this order can be reversed.

The individual steps for the multi-fiber optical cable and the individual steps for the branch cable can be performed in a parallel manner. More specifically, arbitrary multi-fiber ribbons may be extracted respectively from a multi-fiber optical cable and from a branch cable in the first step, single-core optical fibers may be separated respectively from the multi-fiber ribbons extracted of the multi-fiber optical cable and the branch cable in the next step, core alignment of the separated single-core optical fibers may be performed in the subsequent step, and fusing connection may be performed in the following step, thereby performing parallel processing.

Although we use fusion splice as an example in the embodiments above, the other connecting method such as connecterizing means or mechanical splice.

Since the present invention has the above arrangement, it can reliably branch a multi-fiber ribbon in units of single-core optical fibers at high precision, thereby decreasing connection loss.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 265272/1993 filed on Oct. 22, 1993 is hereby incorporated by reference.

What is claimed is:

1. A method for branching an intermediate portion of an optical cable having a plurality of single-core optical fibers arranged in a plane and integrated by a common coating therearound to define a ribbon, comprising the steps of:

exposing an intermediate portion of the ribbon from the optical cable;

extracting the exposed ribbon from the optical cable;

separating at least one single-core optical fiber from the extracted ribbon by the steps of forming a groove in a surface of the common coating and applying a shearing force to the common coating along the groove; and connecting the at least one single-core optical fiber separated from the optical cable to a corresponding single-core optical fiber from a branch cable.

2. A branching method according to claim 1, wherein said step of separating at least one single-core optical fiber from the ribbon, including said steps of forming a groove in the common coating and applying a shearing force to the common coating along the groove, is performed using a separating tool, the separating tool comprising:

a cutter portion for forming the groove in the surface of the common coating of the ribbon held by the optical fiber holder; and a shearing force applying member for applying the shearing force to the common coating along the groove formed by the cutter.

3. A branching method according to claim 2, wherein the common coating of the ribbon has a thickness no greater than 10% of a diameter of one of the single-core optical fibers therein.

4. A branching method according to claim 2, wherein each single-core optical fiber in the ribbon has a respective coating formed therearound, wherein an adhesion strength between the coating formed around a respective single-core optical fiber and the common coating of the ribbon is smaller than an adhesion strength between the coating formed around the respective single-core optical fiber and the respective single-core optical fiber, such that, during said step of applying a shearing force to the common coating along the groove, the common coating tends to shear away from each coating formed around each respective single-core optical fiber before each coating formed around each single-core optical fiber shears away from the respective single-core optical fiber.

5. A branching method according to claim 2, wherein each single-core optical fiber has a respective coating formed therearound, wherein each respective coating formed around each single-core optical fiber has a unique visually perceptible marking, whereby, during said step of separating at least one single-core optical fiber from the ribbon, a given single-core optical fiber can be distinguished from the other single-core optical fibers of the ribbon.

6. A branching method according to claim 1, wherein said step of forming a groove in the common coating of the ribbon includes a step of adjusting a location on the common coating where the groove is formed.

7. A branching method according to claim 6, wherein said step of adjusting a location on the common coating where the groove is formed is performed manually.

8. A branching method according to claim 1, wherein said step of forming a groove in the common coating of the ribbon is performed without cutting into any of the single-core optical fibers in the plurality of single-core optical fibers.

9. A method for branching an intermediate portion of a primary optical cable having a first plurality of single-core optical fibers arranged in a plane and integrated by a common coating therearound to define a first ribbon, to a branch optical cable having a second plurality of single-core optical fibers arranged in a plane to define a second ribbon, comprising the steps of:

exposing an intermediate portion of the first ribbon from the primary optical cable;

extracting the exposed first ribbon from the primary optical cable;

separating at least one single-core optical fiber from an intermediate portion of the extracted first ribbon by the steps of forming a groove in a surface of the common coating and applying a shearing force to the common coating along the groove;

extracting the second ribbon from an end portion of the branch cable;

separating at least one single-core optical fiber from the second ribbon extracted from the end portion of the branch optical cable; and connecting the at least one single-core optical fiber separated from the primary optical cable to the at least one single-core optical fiber separated from the branch optical cable.

10. A branching method according to claim 9, wherein said step of separating at least one single-core optical fiber from the extracted first ribbon, including said steps of forming a groove in the common coating and applying a shearing force to the common coating along the groove, is performed using a separating tool comprising:

a cutter portion for forming a groove in a surface of the common coating of the ribbon; and a shearing force applying member for applying a shearing force to the common coating of the ribbon along the groove formed by the cutter portion.

11. A branching method according to claim 10, wherein the common coating of the first ribbon has a thickness no greater than 10% of a diameter of one of the single-core optical fibers therein.

12. A branching method according to claim 10, wherein each single-core fiber in the first ribbon has a respective coating formed therearound, wherein an adhesion strength between the coating formed around a respective single-core optical fiber in the first ribbon and the common coating is smaller than an adhesion strength between the coating formed around the respective single-core optical fiber in the first ribbon and the respective singe-core optical fiber in the first ribbon, such that, during said step of applying a shearing force to the common coating along the groove, the common coating tends to shear away from the respective coating formed around each single-core optical fiber before the respective coating formed around each single-core optical fiber shears away from the respective single-core optical fiber.

13. A branching method for an optical path according to claim 10, wherein each single-core optical fiber in the first ribbon has a respective coating formed therearound, each respective coating formed around each single-core optical fiber in the first ribbon having a unique visually perceptible marking whereby, during said step of separating at least one single-core optical fiber from the first ribbon, a given single-core optical fiber can be distinguished from the other single-core optical fibers of the first ribbon.

14. A branching method according to claim 2, wherein said step of forming a groove in the common coating of the first ribbon is performed without cutting into any of the single-core optical fibers in the first plurality of single-core optical fibers.

15. A branching method according to claim 2, wherein said step of forming a groove in the common coating of the first ribbon includes a step of adjusting a location on the common coating where the groove is formed.

16. A branching method according to claim 15, wherein said step of adjusting a location on the common coating where the groove is formed is performed manually.

* * * * *